(12) United States Patent
Omae

(10) Patent No.: US 6,608,642 B1
(45) Date of Patent: Aug. 19, 2003

(54) DRIVER IC AND OPTICAL PRINT HEAD

(75) Inventor: Mitsuhiro Omae, Tottori (JP)

(73) Assignees: Sanyo Electric Co., Ltd., Osaka (JP);
Tottori Sanyo Electric Co., Ltd., Tottori (JP)

( * ) Notice: Subject to any disclaimer, the term of this patent is extended or adjusted under 35 U.S.C. 154(b) by 0 days.

(21) Appl. No.: 09/807,438

(22) PCT Filed: Nov. 22, 1999

(86) PCT No.: PCT/JP99/06525
§ 371 (c)(1),
(2), (4) Date: Apr. 23, 2001

(87) PCT Pub. No.: WO00/32398
PCT Pub. Date: Jun. 8, 2000

(30) Foreign Application Priority Data

Nov. 27, 1998 (JP) ............................................ 10-337830
Dec. 8, 1998 (JP) ............................................ 10-348590
Mar. 26, 1999 (JP) ............................................ 11-083770

(51) Int. Cl.$^7$ ................................ B41J 2/47; B41J 2/45
(52) U.S. Cl. ...................................... 347/237; 347/238
(58) Field of Search ............................... 347/237, 238, 347/247, 130, 132; 358/3.06; 327/512

(56) References Cited

U.S. PATENT DOCUMENTS

| 4,689,694 A | * | 8/1987 | Yoshida | 358/3.06 |
| 5,307,089 A | | 4/1994 | Takasu et al. | 346/107 |
| 5,600,363 A | | 2/1997 | Anzaki et al. | 347/237 |
| 6,008,833 A | * | 12/1999 | Ohtsubo et al. | 347/237 |
| 6,028,472 A | * | 2/2000 | Nagumo | 327/512 |

FOREIGN PATENT DOCUMENTS

| JP | 2-25344 | 1/1990 |
| JP | 5-169725 | 7/1993 |
| JP | 9-11540 | 1/1997 |
| JP | 10-226102 | 8/1998 |

* cited by examiner

Primary Examiner—Hai Pham
(74) Attorney, Agent, or Firm—Arent Fox Kintner Plotkin & Kahn

(57) ABSTRACT

A driver IC includes a first driver section for supplying driving signals to n output terminals and a second driver section for selectively switching one of m selection terminals ($m \geq 3$) to a predetermined potential. The first driver section includes a timing control circuit for generating timing signals that permit the second driver section to perform the selective switching. The timing control circuit generates the timing signals based on control signals fed thereto from outside by way of a number of signal lines fewer than m.

22 Claims, 23 Drawing Sheets

DRIVER IC AND OPTICAL PRINT HEAD

TECHNICAL FIELD

The present invention relates to an optical print head suitable for use as a light source in electrostatography (electrostatic copying) and the like, and to a driver IC for use in such an optical print head.

BACKGROUND ART

As disclosed in Japanese Utility Model Published No. H6-48887, in a light-emitting device (array) used in a conventional optical print head, for a plurality of light-emitting portions built as light-emitting diodes, separate electrodes are provided, one for each of the light-emitting portions, on the front surface of the device, and a common electrode, common to all the light-emitting portions, is provided on the back surface of the device. This makes it impossible to perform time-division driving within the device. Where time-division driving is impossible, it is inevitable to provide the same number of separate electrodes as the light-emitting portions. Consequently, as the light-emitting portions are formed with increasingly high density, the separate electrodes need to be formed with accordingly high density, and this makes it difficult to connect the device to a driver IC.

To solve this problem, Japanese Patent Application Laid-Open No. H6-163980 proposes a light-emitting device that permits time-division driving within the device. Specifically, a plurality of light-emitting portions formed on the light-emitting device are grouped into m groups. Moreover, m common electrodes are provided in such a way that each common electrode is connected to the light-emitting portions belonging to one group, and n separate electrodes are provided in such a way that each separate electrode is connected to m light-emitting portions belonging to different groups. Thus, the light-emitting device is provided with m×n light-emitting portions in total. In this light-emitting device, it is possible to select one among m common electrodes on a time-division basis, and this makes it possible to reduce the number of separate electrodes to 1/m of the number conventionally required. This makes it easy to connect the device to a driver IC.

A light-emitting device like this can be driven on a time-division basis by the use of a in, driver IC like those used conventionally. However, in that case, it is necessary to provide separately a driving circuit for selecting the common electrodes of the light-emitting device on a time-division basis. For this reason, efforts have been made to develop a driver IC designed for general purpose use and in addition suitable for time-division driving.

With the aforementioned points in mind, the applicant of the present invention once proposed a driver IC in Japanese Patent Application Laid-Open No. H10-2226102. However, the arrangement proposed in this publication requires an additional process of altering the order of data input to suit time-division driving, and thus requires more complicated data processing.

Moreover, in conventional arrangements, as the number of groups increases, the number of control signal lines for selecting them accordingly increases. This inevitably increases the number of terminals of a driver IC.

DISCLOSURE OF THE INVENTION

An object of the present invention is to provide a driver IC suitable to drive a light-emitting device ready for time-division driving.

Another object of the present invention is to reduce the number of terminals of a driver IC designed to drive a light-emitting device on a group-by-group basis.

To achieve the above objects, according to one aspect of the present invention, in a driver IC having a first driver section for outputting driving signals via n output terminals and a second driver section for selectively switching one of m selection terminals (where $m \geq 3$) to a predetermined potential, wherein the first driver section includes a control circuit for designating the destinations to which the second driver is to supply the driving signals, and the control circuit designates the destinations to which to supply the driving signals on the basis of control signals that are fed thereto from outside by way of a number of signal lines fewer than m.

According to another aspect of the present invention, in a driver IC having a first driver section for outputting driving signals via n output terminals and a second driver section for selectively switching one of m selection terminals to a predetermined potential, the first driver section is composed of a data signal storage circuit for storing at least n×m data signals fed thereto sequentially, a data selection circuit for selecting and extracting, in batches of n data signals, the data signals stored in the data signal storage circuit, and a drive circuit for outputting the driving signals on the basis of the data signals selected by the data selection circuit.

According to another aspect of the present invention, in an optical print head composed of a light-emitting device, having n separate electrodes each connected to first electrodes of m light-emitting diodes (where $m \geq 3$) and m common electrodes connected individually to the second electrodes of the m light-emitting diodes, and a driver IC, having n output terminals connected individually to the separate electrodes, a first driver section for outputting the driving signals via the output terminals, m selection terminals connected individually to the common electrodes, and a second driver section for selectively switching one of the selection terminals to a predetermined potential, wherein the first driver section includes a control circuit for designating the destinations to which the second driver section is to supply the driving signals, and the control circuit designates the destinations to which to supply the driving signals on the basis of control signals that are fed thereto from outside by way of a number of signal lines fewer than m.

According to another aspect of the present invention, in an optical print head composed of a light-emitting device, having n separate electrodes each connected to first electrodes of m light-emitting diodes (where $m \geq 3$) and m common electrodes connected individually to the second electrodes of the m light-emitting diodes, and a driver IC, having n output terminals connected individually to the separate electrodes, a first driver section for outputting the driving signals via the output terminals, m selection terminals connected individually to the common electrodes, and a second driver section for selectively switching one of the selection terminals to a predetermined potential, the first driver section is composed of a data signal storage circuit for storing at least n×m data signals fed thereto sequentially, a data selection circuit for selecting and extracting, in batches of n data signals, the data signals stored in the data signal storage circuit, and a drive circuit for outputting the driving signals on the basis of the data signals selected by the data selection circuit.

BEST MODE FOR CARRYING OUT THE INVENTION

Hereinafter, embodiments of the present invention will be described.

First Embodiment

Figure 1:
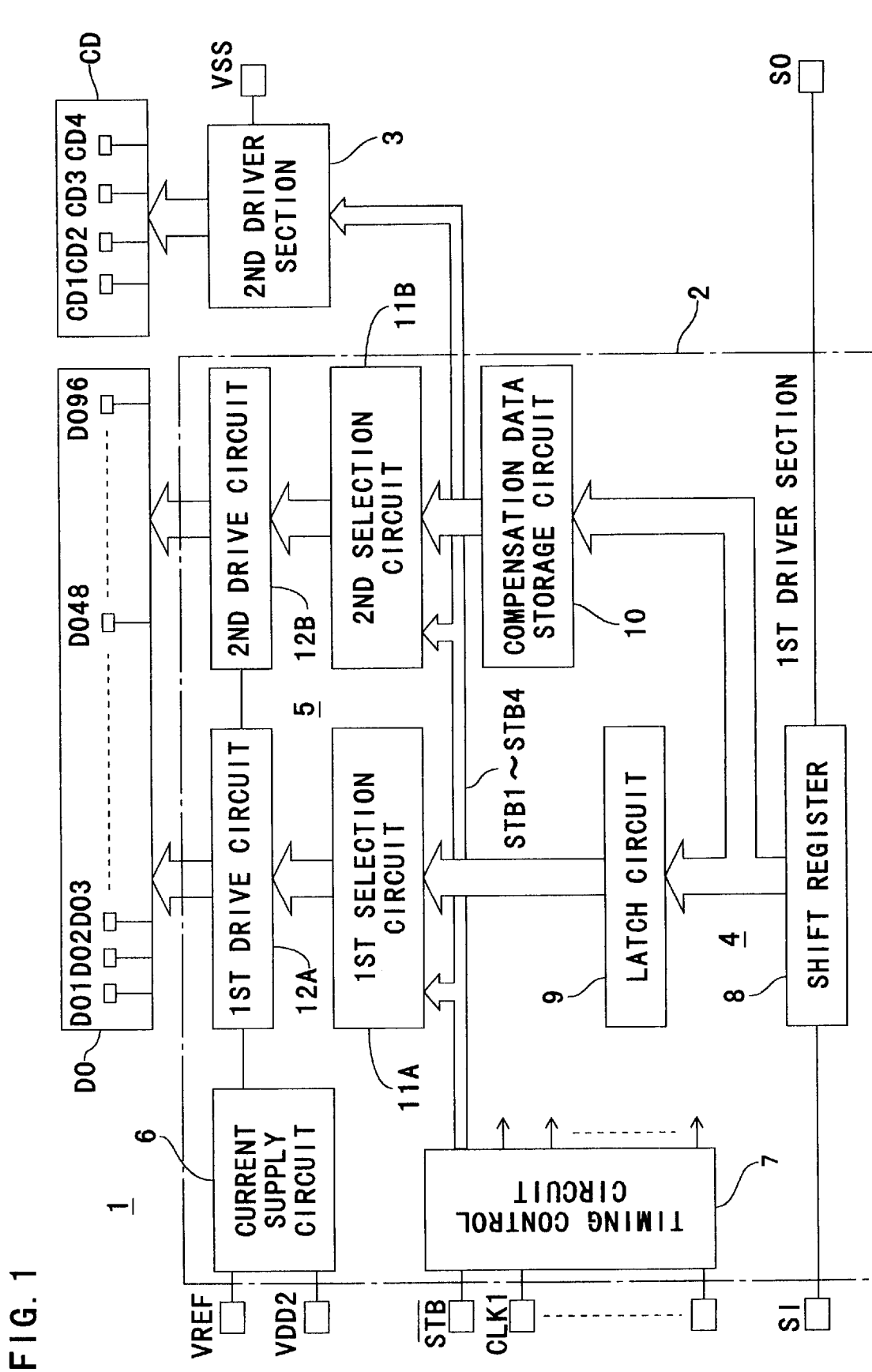
FIG. 1 is a circuit block diagram of the driver IC of a first embodiment of the present invention.
Figure 2:
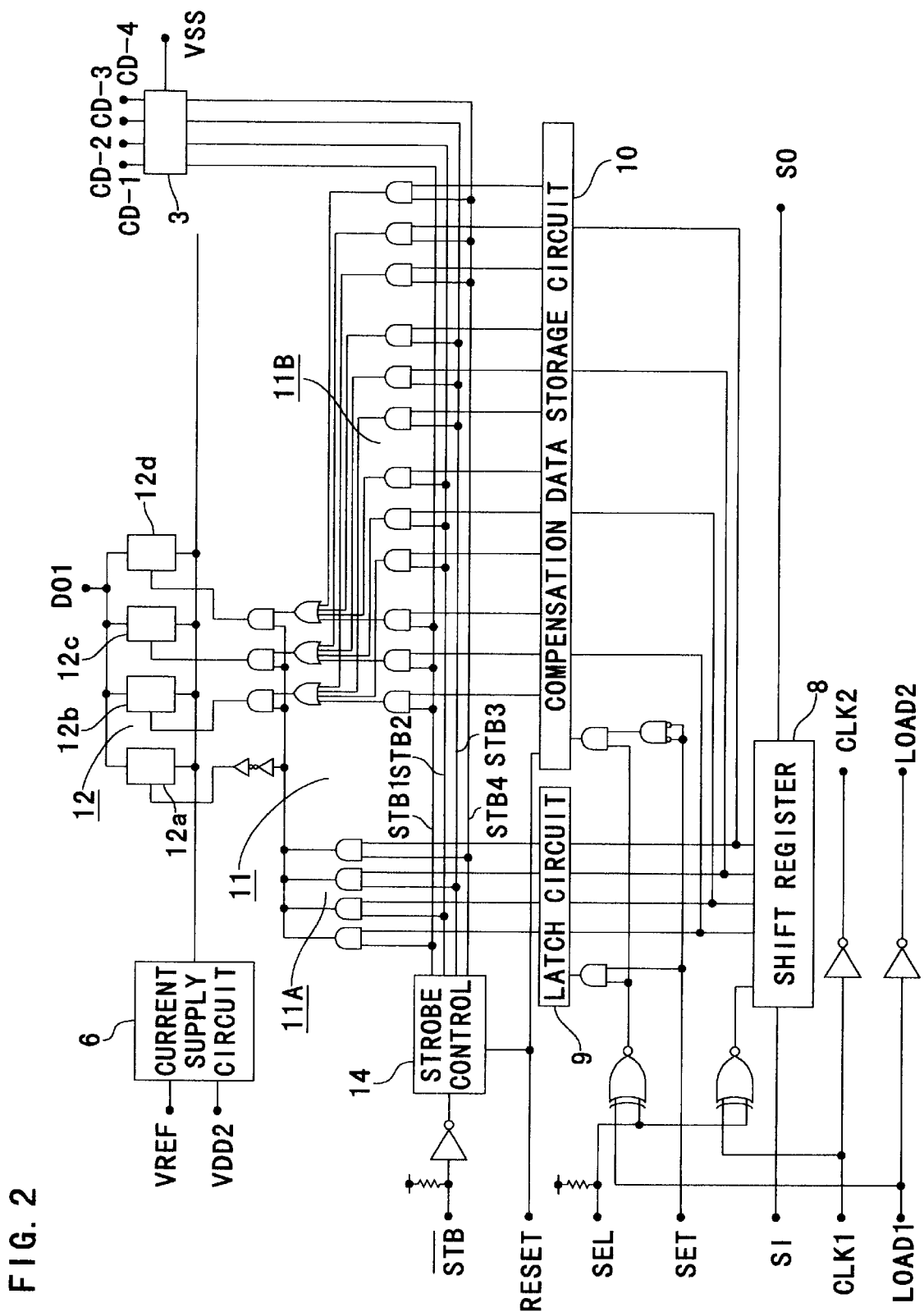
FIG. 2 is a circuit block diagram showing a principal portion of the first embodiment.

FIG. 1 is a circuit block diagram showing the basic configuration of the driver IC of a first embodiment of the invention. FIG. 2 is a circuit block diagram of a principal portion of the circuit block diagram shown in FIG. 1, specifically a portion related to one output terminal DO1 among a plurality of output terminals DO1 to DO96. First, descriptions will be given with reference to these figures.

As shown in FIG. 1, the driver IC 1 is provided with: a separate terminal section DO consisting of a plurality of (n) output terminals DO1 to DO96 for driving a device (i.e. for the separate electrodes 28 described later); a first driver section 2, connected to the individual output terminals DO1 to DO96, for feeding predetermined current outputs, as driving signals, to those output terminals DO1 to DO96; a common terminal section CD consisting of a plurality of (m) output terminals CD1 to CD4 for group selection (i.e. for the common electrodes 27 described later); and a second driver section 3, connected to the individual output terminals CD1 to CD4, for selectively switching those output terminals CD1 to CD4 to one of the supply power potentials, for example to the ground potential VSS. It is to be understood that, although the following descriptions deal with a case where n=96 and m=4, the present invention is not limited to any specific numbers for n and m.

The first driver section 2 is provided with: a data signal storage circuit 4 for temporarily storing serial input data signals fed thereto sequentially via a data input terminal SI; a driver circuit 5 for outputting driving signals to the individual output terminals DO1 to DO96 on the basis of the data signals output from the data signal storage circuit 4; a current supply circuit 6 for supplying a constant current to the driver circuit 5; and a timing control circuit 7 for feeding predetermined timing signals to various points in the first and second driver sections 2 and 3.

The data signal storage circuit 4 is provided with: a shift register 8 of an n×m (384)-bit type that, in synchronism with a clock signal CLK1, takes in the data signals input serially via the data input terminal SI and outputs them serially via a data output terminal SO; and a latch circuit 9 of an n×m (384)-bit type that, on the basis of a load signal LOAD1, takes in, in parallel, the data signals taken in by the shift register 8. The n×m (384) data signals output parallel from the shift register 8 are also fed to a storage circuit 10 without being passed through the latch circuit 9.

In cases where, for example, each data signal consists of a plurality of bits, the configuration of the shift register 8, the latch circuit 9, and other relevant circuits may be modified accordingly. For example, the shift register 8 may be built as a memory the access to which is controlled by the use of addresses.

The driver circuit 5 is provided with, as its essential components: a first selection circuit 11A that sequentially selects and outputs, in batches of n data signals, the n×m (384) data signals output from the latch circuit 9; and a first drive circuit 12A of an n (96)-bit type that, on the basis of the outputs of the first selection circuit 11A, outputs constant currents via the output terminals DO1 to DO96. As required, in addition to these essential components, the driver circuit 5 is further provided with: a compensation data storage circuit 10 for storing n×m (384) sets of compensation data to cope with output compensation; a second selection circuit 11B for compensation data that sequentially selects and outputs, in batches of n sets of data, the n×m (384) sets of compensation data output from the compensation data storage circuit 10; and a second drive circuit 12B for compensation that outputs, as driving signals, currents of which the values have been increased or decreased on the basis of the outputs of the selection circuit 11B for compensation data.

Figure 6:
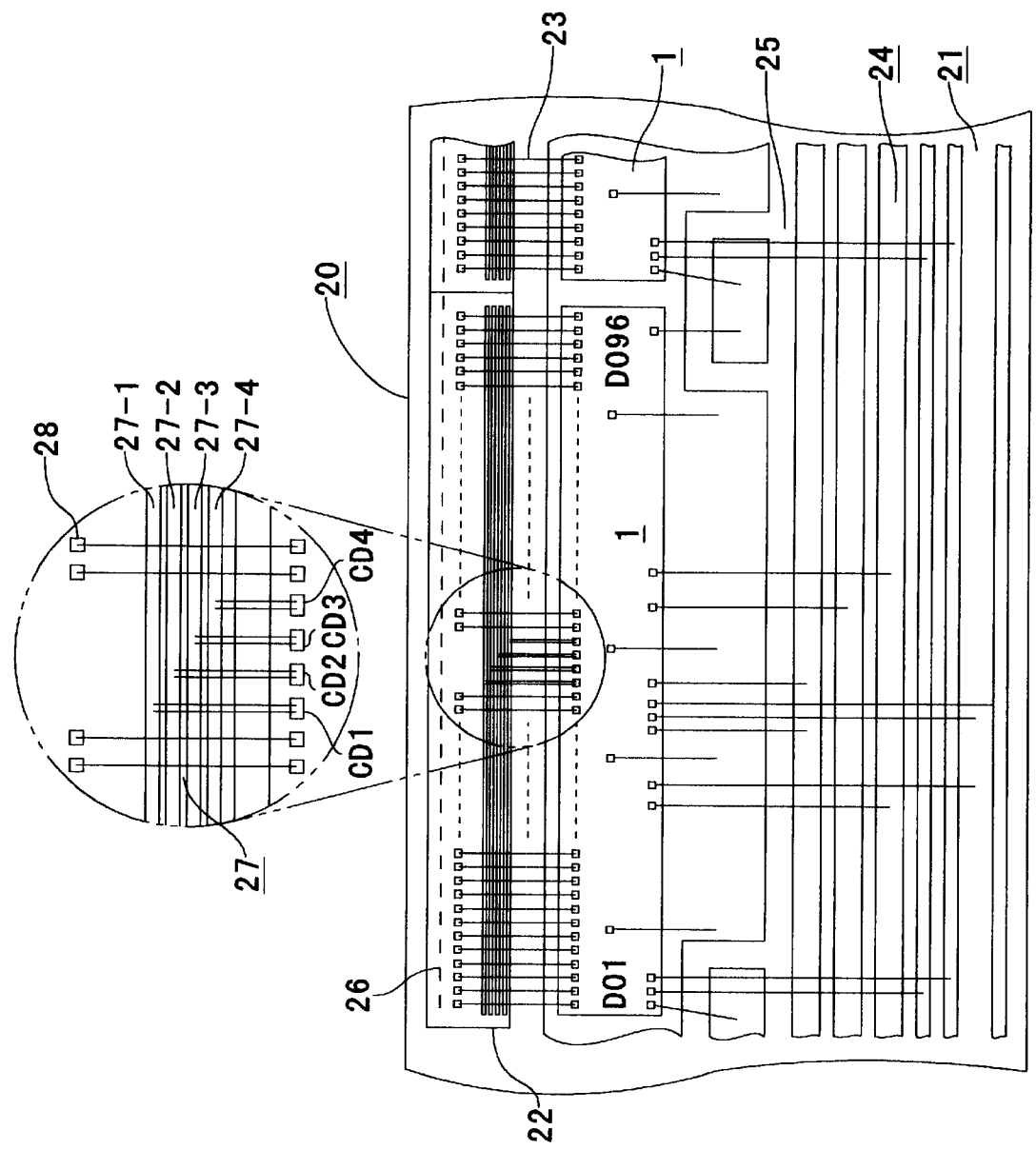
FIG. 6 is a plan view of a principal portion of an example of the optical print head of the first to a fifth embodiment of the present invention.

In the storage circuit 10 is stored light amount compensation data that is calculated beforehand to make even the amounts of light emitted from the individual light-emitting portions 26 (see FIG. 6). The storage circuit 10 is built, for example, as a latch circuit of a S×n×m-bit type so that n×m (384) sets of compensation data each consisting of S bits (for example, 3 bits) can be stored therein. The writing of the compensation data to the compensation data storage circuit 10 is achieved on the basis of the signals that are fed parallel, in batches of n×m signals, from the shift register 8.

The writing of the compensation data to the compensation data storage circuit 10 can be done beforehand; specifically, it can be achieved, with the storage circuit 10 alone brought into a write-enabled state, by repeating store operations three times so that all the bits of each set of compensation data are stored therein through the shift register 8.

As shown in FIG. 2, the drive circuit 12 has, for one output terminal DO1, a set of four current amplifiers 12a to 12d that output different current outputs; that is, the drive circuit 12 has, in all, the same number of sets of such current amplifiers as the output terminals constituting the separate terminal section DO. The four current amplifiers 12a to 12d, which are fed with currents from the current supply circuit 6, are controlled individually so that their total output current can be varied in a range from about 3 to 5 mA around a base current of 4 mA.

The selection circuit 11 is a circuit for selecting and extracting the n×m sets of data and of compensation data stored in the latch circuit 9 and in the compensation data storage circuit 10 in batches of n sets of data, i.e. in a plurality of (m) steps, so as to achieve time-division driving. The selection circuit 11 is composed of a plurality of logic gate circuits, of which the states, i.e. open or closed, are controlled by a strobe control signal generating circuit 14 included in the timing control circuit 7.

Figure 3:
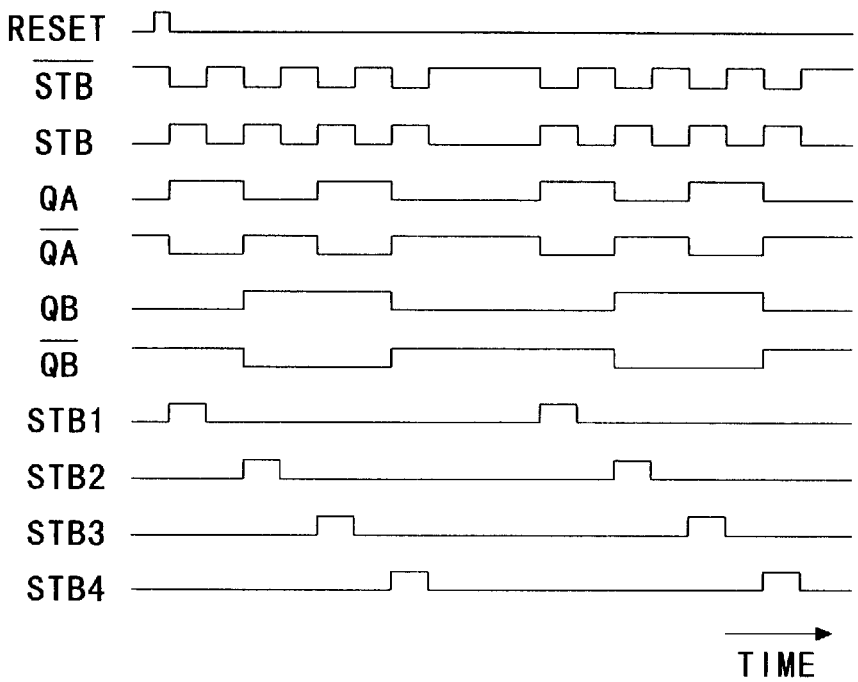
FIG. 3 is a waveform diagram showing the waveforms observed at relevant points in the first embodiment.
Figure 4:
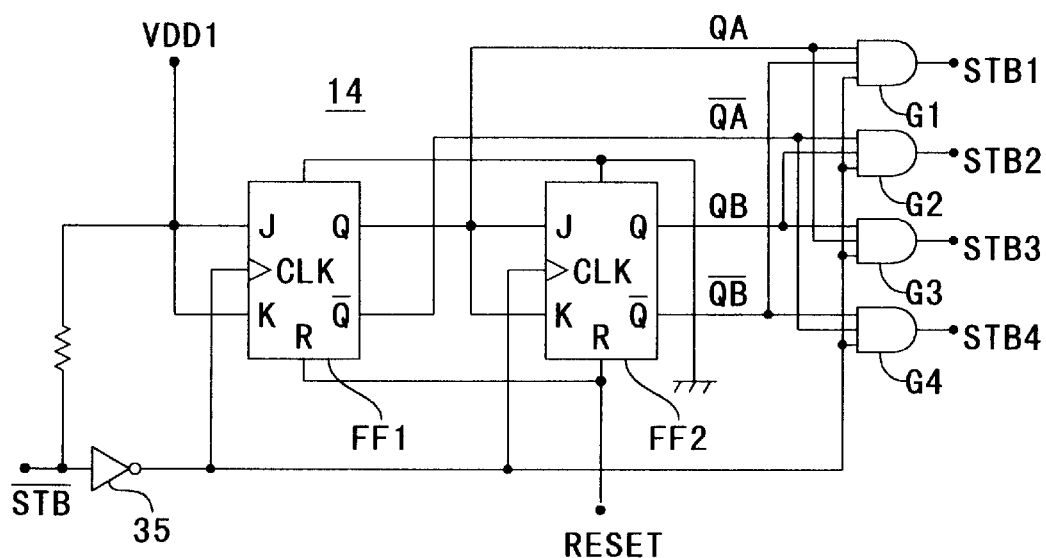
FIG. 4 is a circuit diagram showing a principal portion of FIG. 2.

As shown in a waveform diagram in FIG. 3, the strobe control signal generating circuit 14 is a circuit for generating internal strobe signals (STB1 to STB4) that are used to divide the period defined by an external strobe signal STB into a plurality of periods. As shown in FIG. 4, the strobe control signal generating circuit 14 is composed of, for example, two flip-flops FF1 and FF2 and a counter consisting of a plurality of (four) logic gate circuits G1 to G4 combined together.

Specifically, the JK flip-flop FF1 receives at its input terminals J and K a supply voltage VDD1, which is at a high level (hereinafter H level), and receives at its clock input terminal CL the external strobe signal $\overline{STB}$ after being inverted by an inverter 35. The flip-flop FF1 outputs at its output terminal Q a signal QA, and outputs at its output terminal $\overline{Q}$ a signal $\overline{QA}$. The JK flip-flop FF2 receives at its input terminals J and K the signal QA, and receives at its clock input terminal CL the strobe signal STB. The flip-flop FF2 outputs at its output terminal Q a signal QB, and outputs at its output terminal $\overline{Q}$ a signal $\overline{QB}$. The logic gate circuit G1 performs AND operation on the signal QA, the signal $\overline{QB}$, and the strobe signal STB, and outputs an internal strobe signal STB1. The logic gate circuit G2 performs AND operation on the signal $\overline{QA}$, the signal QB, and the strobe signal STB, and outputs an internal strobe signal STB2. The logic gate circuit G3 performs AND operation on the signal QA, the signal QB, and the strobe signal STB, and outputs an internal strobe signal STB3. The logic gate circuit G4 performs AND operation on the signal $\overline{QA}$, the signal $\overline{QB}$, and the strobe signal STB, and outputs an internal strobe signal STB4. The flip-flops FF1 and FF2 receive at their reset input terminals R a reset signal RESET.

In this way, the strobe control signal generating circuit 14 generates four internal strobe signals (STB1 to STB 4) on the basis of a single external strobe signal $\overline{STB}$. That is, control signals (external strobe signals) can be fed in by way of a number of signal lines fewer than internal strobe signals. This makes it possible to reduce the number of terminals required to receive control signals from outside and thereby make the IC smaller, and in addition makes it possible to reduce the number of wires, such as those wire-bonded, for external connection.

The strobe control signal generating circuit 14 can be reset not only by the use of the reset signal RESET, but also in synchronism with the input of data signals that correspond to one line. This is achieved, for example, by resetting the flip-flops FF1 and FF2 by the use of the aforementioned load signal LOAD1.

Next, with reference to FIG. 2, the flow of data will be described with respect to one output terminal DO1. As the internal strobe signals STB1 to STB4 turn to H level one after the next, four AND gate circuits that are provided in the first selection circuit 11A and are connected to those internal strobe signals STB1 and STB4 and to the latch circuit 9 are opened one after the next. As a result, the data (384 sets of on/off data that correspond to a whole IC 1) stored in the latch circuit 9 is selectively output through the AND gate circuit that is open at each moment. In the example shown in FIG. 2, the first to fourth sets of data within the IC are used one after the next to drive the drive circuit 12. On the other hand, in a similar manner, as the internal strobe signals STB1 to STB4 turn to H level one after the next, four sets of three AND gates that are provided in the second selection circuit 11B are opened one set after the next. As a result, the compensation data, consisting of sets of three-bit data, stored in the compensation data storage circuit 10 is selectively output through the AND gate circuits that are open at each moment. The outputs of the compensation data storage circuit 10 are fed to the drive circuit 12, where they, in cooperation with the data fed from the latch circuit 9 through the first selection circuit 11A, selectively activate the three current amplifiers 12b to 12d.

Next, the second driver section 3 will be described. The second driver section 3 is a circuit for selectively switching one of the output terminals CD1 to CD4 to the ground potential VSS, and is so configured as to perform the switching with timing synchronous with the internal strobe signals STB1 to STB4. However, the second driver section 3 may be so configured as to perform the switching by the use of other signals synchronous with the timing of the selection performed by the selection circuit 11.

FIG. 6 is a plan view of a principal portion of an example of an optical print head 20. Here, as driver ICs 1, the driver IC of one of the first to fifth embodiments of the invention is employed. In this optical print head 20, a plurality of, for example nineteen, light-emitting devices 22 are arranged in a row on an insulating circuit board 21, and, on one side of those light-emitting devices, adjacently thereto, driver ICs 1 are arranged in a row in such a way as to correspond one to one to the light-emitting devices 22. In this example, the driver ICs 1 are arranged on one side of the light-emitting devices 22; however, in cases where the driver ICs 1 are arranged on both sides of the light-emitting devices 22, they are arranged in such a way that two of the former correspond to one of the latter. Between the light-emitting devices 22 and the driver ICs 1 is laid wiring 23 for connecting them together. This wiring 23 may be realized through direct connection using metal or other wire-bonding wires, or through indirect connection using wire-bonding wires by way of relay patterns, or even by bonding high-density flexible wiring with anisotropic conductive adhesive.

On the circuit board 21, a plurality of wiring patterns 24 for signal transfer and for power supply are formed along the direction in which the light-emitting devices 22 are arranged. Between the driver ICs 1 and the wiring partners 24 is laid wiring 25 similar to the wiring 23.

The light-emitting device 22 has a plurality of (m×n=384) light-emitting portions 26 arranged on the upper surface thereof, along the longer sides thereof. To permit time-division driving, these light-emitting portions 26 are formed independently of one another, and are grouped into a plurality of (m) groups so that they can be driven group by group on a time-division basis. In the example under discussion, the light-emitting portions 26 are grouped into four groups according to the remainder that is left when the number representing their order of arrangement is divided by four, such that the first, fifth, ninth, . . . light-emitting portions belong to the first group, the second, sixth, tenth, . . . light-emitting portions belong to the second group, the third, seventh, eleventh, . . . light-emitting portions belong to the third group, and the fourth, eighth, twelfth, . . . light-emitting portions belong to the fourth roup.

Moreover, in the light-emitting device 22 are provided a common electrode 27-1 common to the light-emitting portions 26 belonging to the first group, a common electrode 27-2 common to the light-emitting portions 26 belonging to the second group, a common electrode 27-3 common to the light-emitting portions 26 belonging to the third group, a common electrode 27-4 common to the light-emitting portions 26 belonging to the fourth group, and n (96) separate electrodes 28 each connected to four adjacent ones of the light-emitting portions 26. The separate electrodes 28 are connected individually to the output terminals DO1 to DO96 of the driver IC 1, and the common electrodes 27 are connected individually to the output terminals CD1, CD2, CD3, and CD4 thereof Thus, by selecting one of the common electrodes 27 at a time and energizing the separate electrodes DO in an appropriate manner, it is possible to make one quarter after the next of the light-emitting portions 26 emit light on a time-division basis.

Since there are provided L (19) light-emitting devices 22 in total, the number of light-emitting portions 26 throughout the head 20 is L×m×n=19×4×96=7296.

Figure 7:
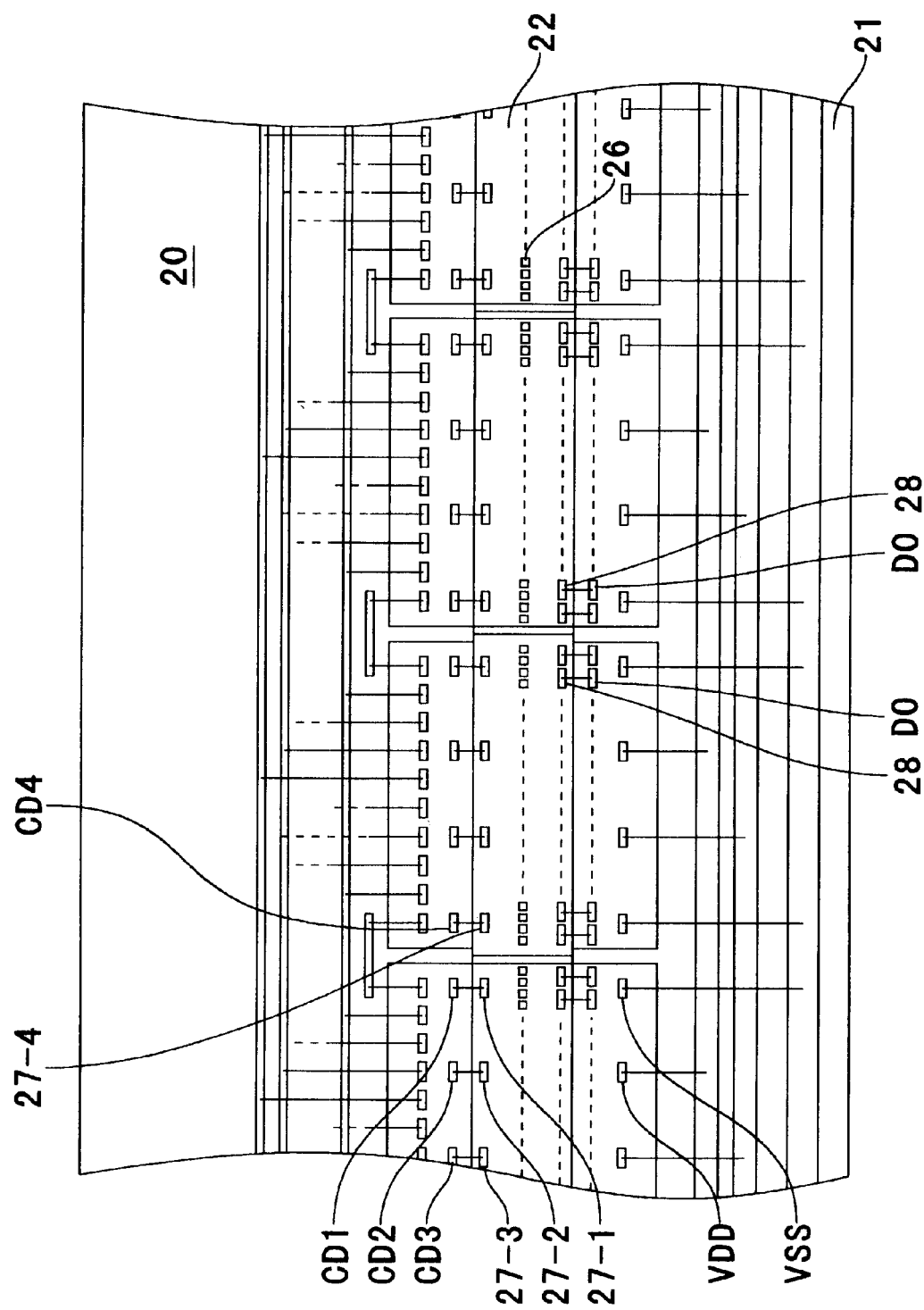
FIG. 7 is a plan view of a principal portion of another example of the optical print head of the first to fifth embodiments.
Figure 8:
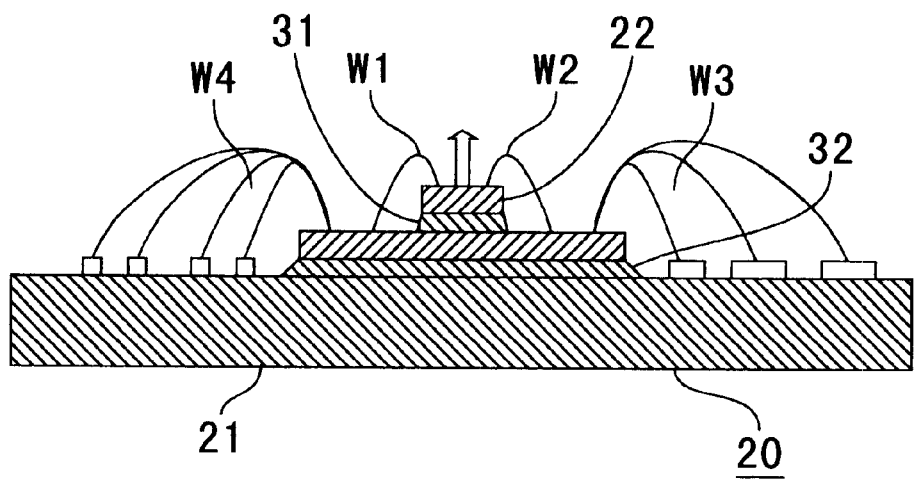
FIG. 8 is a sectional view of FIG. 7.

FIG. 7 is a plan view of a principal portion of another example of the optical print head 20. Here also, as in the optical print head shown in FIG. 6, as driver ICs 1, the driver IC of one of the first to fifth embodiments of the invention is employed. FIG. 8 is a sectional view of a principal portion of this optical print head 20. As shown in this figure, the optical print head 20 has light-emitting devices 22, each having a plurality of light-emitting portions 26, and driver ICs 1, for driving those light-emitting devices 22, mounted on the upper surface of a circuit board 21.

The light-emitting device 22 is formed by selectively diffusing P-type and N-type impurities in a semiconductor substrate so as to form a plurality of PN junctions functioning as the light-emitting portions 26 in a row. The common electrodes CD1 to CD4 and the separate electrodes 28 are arranged on the upper surface of the light-emitting device 22, along opposite sides thereof, so as to sandwich the light-emitting portions 26. The light-emitting device 22 is fixed on the upper surface of the driver IC 1 with electrically insulating adhesive 31 such as epoxy resin.

The driver IC 1 is rectangular in shape, with approximately the same length as and a i sufficiently wider width than the light-emitting device 22, and incorporates the second driver section 3 (see FIGS. 1 and 10) for selectively driving the common electrodes 27-1, 27-2, 27-3, and 27-4 and the first driver section 2 (see FIGS. 1 and 10) for selectively driving the separate electrodes 28. In the center of the upper surface of the driver IC 1, a region for placing the light-emitting device 22 is secured. On both sides of this region, a first and a second row of Ad terminals to be wire-bonded to the light-emitting device 22 are arranged, and on both sides of these rows of terminals, a third and a fourth row of terminals to be wire-bonded to the circuit board 21 are arranged. The first row of terminals consists of a plurality of terminals DO corresponding to the separate electrodes 28 of the light-emitting device 22, and the second row of terminals consists of terminals CD1, CD2, CD3, and CD4 corresponding to the common electrodes 27-1, 27-2, 27-3, and 27-4 of the light-emitting device 22. The third row of terminals consists of terminals VDD and VSS for power supply, and the fourth row of terminals consists of terminals CLK1, STB, and other terminals for display-data and timing signal transfer.

The driver IC 1 is fixed on the upper surface of the circuit board 21 with electrically insulating adhesive 32 such as epoxy resin. The circuit board 21 is built as a printed circuit board or the like having conductive patterns formed on a glass epoxy board. In the center of he upper surface of the circuit board 21, a region for placing the driver IC 1 is secured, and n both sides thereof, wiring patterns for signal transfer and wiring patterns for power supply are formed along the longer sides of the circuit board 21.

Next, the manufacturing process of the optical print head 20 shown in FIGS. 7 and 8 will be described. First, light-emitting devices 22 are fixed on the upper surfaces of driver ICs 1 with insulating adhesive 31, and then wiring is laid between them by the use of wires W1 and W2 so as to form a plurality of units each composed of a driver IC 1 mounted on a light-emitting device 22. Before these units are fixed on the circuit board 21, they are tested for their characteristics so as to be either accepted as properly working units or otherwise rejected. Only accepted units are arranged on the upper surface of the circuit board 21 and fixed thereon with electrically insulating adhesive 32, and then wiring is laid between the circuit board 21 and the driver ICs 1 through wire-bonding using wires W3 and W4.

In this way, it is possible to manufacture an optical print head having a plurality of driver ICs 1 arranged in a row along the longer sides of a circuit board 21 and having a plurality of light-emitting devices 22 arranged in a row on top of those driver ICs 1. Then, by making the driver ICs 1 operate in such a way as to keep one of the common electrodes CD 1 to CD4 of the light-emitting devices 22 at a low level (hereinafter L level) at a time and applying a predetermined voltage to the separate electrodes 28 in an appropriate manner, it is possible to selectively turn on the light-emitting portions 26.

In this configuration, the wire-bonding performed to connect the driver ICs 1 and the circuit board 21 together is performed on both sides of the driver ICs 1. This helps, as compared with cases where the wire-bonding is performed on one side only, shorten the length of the wires W and thereby reduce the risk of a short circuit, and in addition reduce wire-bonding density and thereby enhance wire-bonding efficiency. This in turn helps increase flexibility in the design of the arrangement of terminals and wiring patterns on the driver ICs 1 and the circuit board 21.

Incidentally, as increasingly high resolution is sought in the optical print head 20, the size of the light-emitting portions 26 have been becoming accordingly smaller. And this has been increasing the occurrence of light emission failure in the light-emitting portions 26 resulting from crystallization irregularities in the semiconductor substrates, in particular the occurrence of the lowering of light emission brightness after a predetermined period of energization. By forming units each composed of a light-emitting device 22 mounted on a driver IC 1 and then subjecting those units to energization tests beforehand as described above, it is possible to detect such light emission failure in advance and thereby greatly reduce the occurrence of failure in the optical print head 20. This makes the optical print head 20 ready for higher resolution. It is to be understood, however, that the optical print head 20 embodying the present invention may be manufactured in any other manner than specifically described above; for example, they may be manufactured by first arranging and fixing a plurality of driver ICs 1 sequentially on a circuit board 5, then arranging and fixing a plurality of light-emitting devices 22 sequentially on the upper surfaces of the driver ICs 1, and then performing wire-bonding between the light-emitting devices 22, the driver ICs 1, and the circuit board 21.

Moreover, cathode and anode electrodes are formed on the upper surfaces of the light-emitting devices 22, and the wire-bonding between the driver ICs 1 and the light-emitting devices 22 is performed on the surfaces of the light-emitting devices 22. This helps enhance assembly efficiency as compared with cases where light-emitting devices are arranged on a single, plate-shaped common electrode as practiced conventionally.

Moreover, it is possible to set relatively freely the arrangement of terminals on the driver ICs 1 and the arrangement of wiring on the circuit board 21. For example, it is possible to minimize the distance between the power supply terminals VDD of the driver ICs 1 and the output terminals DO of the light-emitting devices 22 so as to minimize the loss of electric power between those terminals.

Moreover, the light-emitting devices 22, which are mounted on the driver ICs 1, have approximately the same thermal expansion coefficient as the driver ICs 1. This helps greatly reduce the strain (compression strain) applied to the light-emitting devices 22 as compared with cases where light-emitting devices 22 having a thermal expansion coefficient greatly different from that of driver ICs 1 are mounted on the driver ICs 1.

Figure 9:
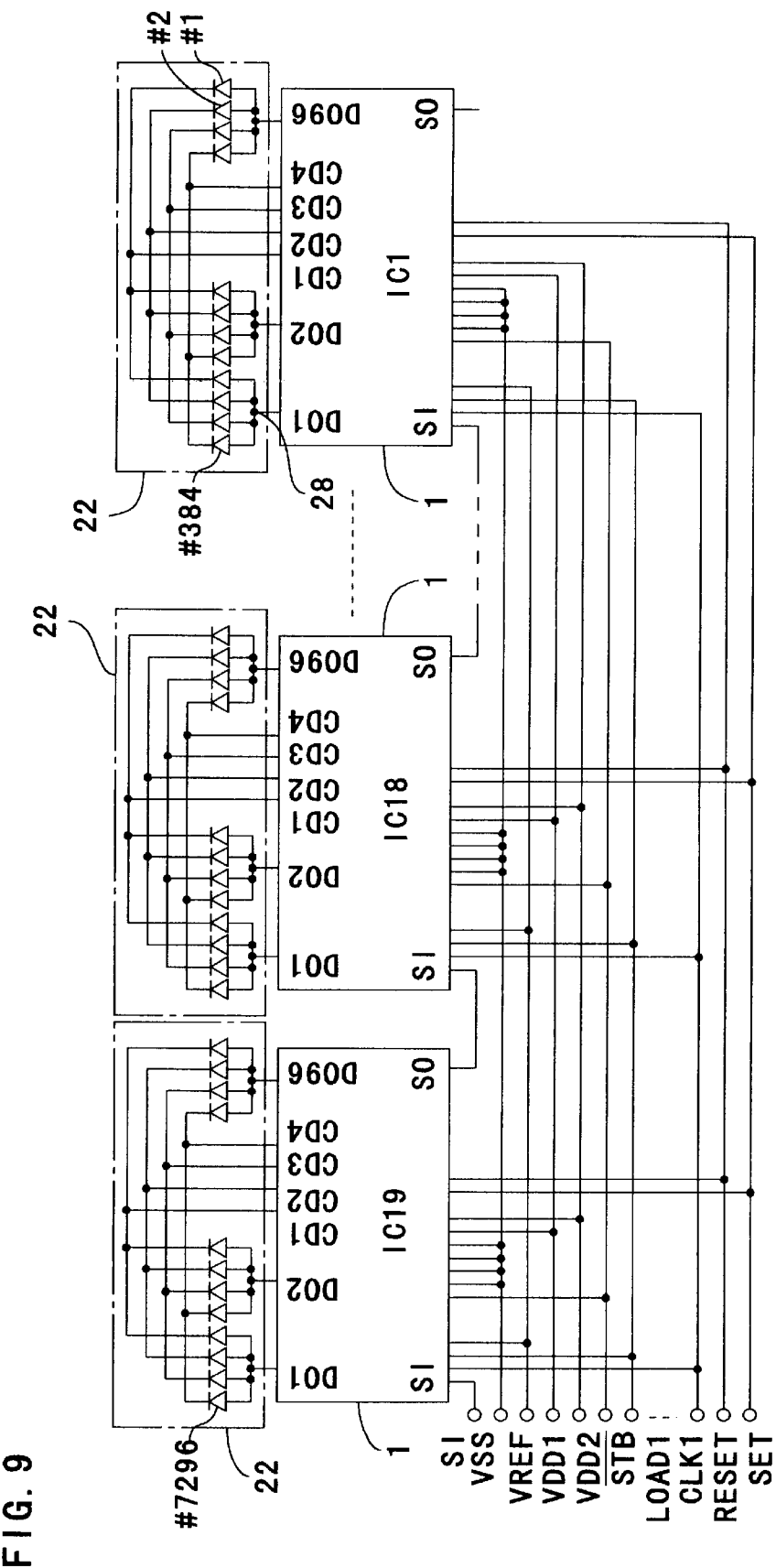
FIG. 9 is a circuit block diagram of the optical print head of the first to fifth embodiments.

FIG. 9 is a circuit block diagram of the optical print head 20. The optical print head 20 has nineteen light-emitting devices 22 arranged in a row. The numbers starting with a # are the serial numbers of the light-emitting portions 26 provided throughout the optical print head 20. The separate electrodes 28 are each connected to all the light-emitting portions 26 (to their anodes) belonging to one of groups of four light-emitting portions, and the cathodes of the light-emitting portions 26 belonging to each group are connected individually to the common electrodes 27-1, 27-2, 27-3, and 27-4. The separate electrodes 28 are connected to the separate terminals DO1 to DO96 of the driver ICs 1. The common electrodes 27-1, 27-2, 27-3, and 27-4 are connected respectively to the output terminals CD1, CD2, CD3, and CD4. The data input terminal SI of the first driver IC 1 is connected to the data output terminal SO of the second driver IC 1. Likewise, the data input terminals SI of the second to eighteenth driver ICs 1 are connected respectively to the data output terminals SO of the driver ICs 1 having the numbers greater by one. To the data input terminal SI of the nineteenth driver IC 1, data signals are fed from outside. Each driver IC 1 receives the supply voltage VDD1, the external strobe signal $\overline{STB}$, the load signal LOAD1, and other signals.

Figure 5:
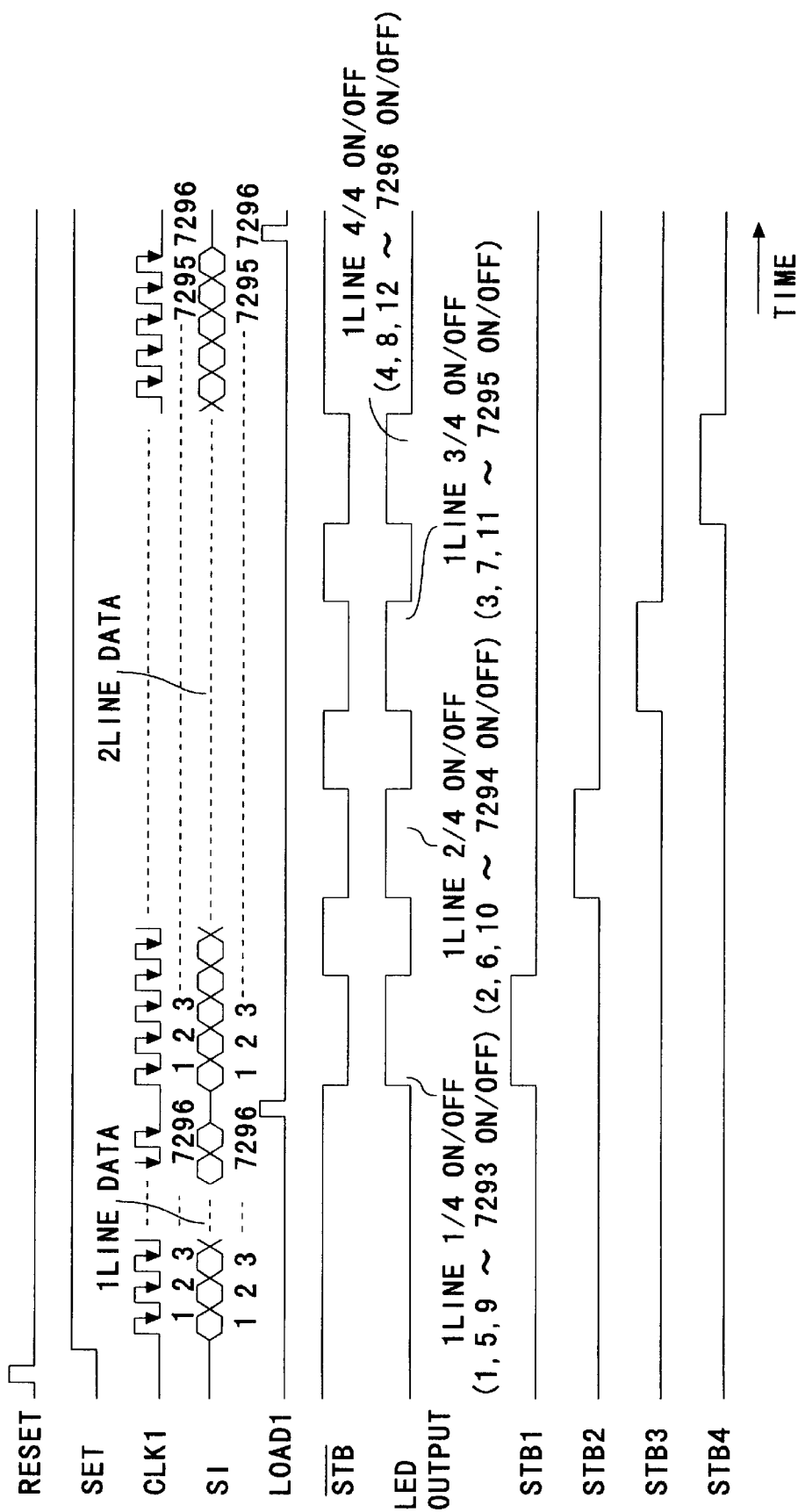
FIG. 5 is a timing chart of the first embodiment.

Next, the operation of the optical print head 20 described above, including the operation of the driver IC 1 of the first embodiment, will be described with reference to, in addition to FIGS. 1 and 2, FIG. 9, which shows an example of the circuit configuration of the optical print head, and FIG. 5, which shows a timing chart. In the following descriptions, it is assumed that the compensation data to be stored in the storage circuit 10 has already been stored there.

First, the reset signal RESET is fed in to initialize relevant circuit blocks. Next, a set signal SET is turned from L level to H level. This brings the storage circuit 10 into a write-disabled state.

Data signals (7,296 signals) are sequentially fed to the data input terminal SI of the nineteenth driver IC 1, and are sequentially taken in by the shift registers 8 of the individual driver ICs 1 in synchronism with the clock signal CLK1.

Next, the load signal LOAD1 is held at H level for a predetermined period. This causes the n×m data signals held in the shift registers 8 of the individual driver ICs 1 to be input. Here, at the trailing edge of the load signal LOAD1, the latch circuits 9 are selected (latched), so that the n×m data signals taken in by the shift registers 8 are fed to and stored in the latch circuits 9.

Immediately after the load signal LOAD1 turns from H level to L level, the external strobe signal $\overline{STB}$, which indicates the timing of light emission, turns from H level to L level to remain at L level for a predetermined period, and simultaneously only the internal strobe signal STB1 output from the strobe control signal generating circuit 14 turns from L level to H level. When the external strobe signal $\overline{STB}$ turns from H level to L level next time, only the internal strobe signal STB2 turns to H level. Likewise, thereafter, only STB3, and then only STB4, turns to H level on a one-at-a-time basis.

As the internal strobe signals STB1 to STB4 are switched in this way, the positions of the data signals that the selection circuit 11 selects from those stored in the latch circuit 9 and the storage circuit 10 for output are switched sequentially. The internal strobe STB1 selects the first, fifth, . . . and 7,293rd sets of data. The internal strobe STB2 selects the second, sixth, . . . and 7,294th sets of data. The internal strobe STB3 selects the third, seventh, . . . and 7,295th sets of data. The internal strobe STB4 selects the fourth, eighth, . . . and 7,296th sets of data.

These sets of data (with compensation data, consisting of sets of three-bit data, added thereto as required) are fed to the drive circuit 12. On the basis of the data signals and the compensation data added thereto, the drive circuit 12 selectively activates the four current amplifiers 12a to 12d so that their output currents are supplied via the output terminals DO to the individual separate electrodes 28 (the electrodes 28 are shown in FIG. 9) of the light-emitting devices 22.

Now, it is possible to supply the separate electrodes 28 of all the light-emitting devices 22 with currents according to the data signals or compensation data. However, in this example, since only a quarter of the light-emitting portions 26 are grounded via the common electrodes 27, selectively only every fourth light-emitting portion 26 emits light.

The period for which the thus selected light-emitting portions 26 emit light is equal to the predetermined period for which the external strobe signal $\overline{STB}$ remains at L level. Thus, by controlling the period for which the external strobe signal $\overline{STB}$ is held at L level, it is possible to control easily the period for which the light-emitting portions 26 emit light.

By making one quarter after another of the light-emitting portions corresponding to one line emit light through time-division driving as described above, and performing this repeatedly, it is possible to achieve exposure of one frame.

In the configuration described above, the driver ICs 1 for driving the light-emitting devices 22 ready for time-division driving within each device incorporate the second driver sections 3 that operate in synchronism with the timing of group-by-group driving, and those driver ICs 1 achieve the time-division driving of the corresponding light-emitting devices 22. This makes it possible to distribute the load. Thus, the maximum load imposed on the second driver sections 3 can be determined on the basis of the number of light-emitting portions 26 that belong to the group of the corresponding light-emitting devices 22. As a result, as compared with cases where time-division driving is achieved with ICs dedicated to time-division driving as in conventional dynamic driving methods, it is possible to greatly reduce the load imposed on the circuits for time-division driving. Moreover, the second driver sections 3 of the driver ICs 1 can be built as a small-scale circuit that controls small currents, and thus it is possible to build the driver ICs 1 in a shape similar to that of conventional ICs for static driving and thereby scale down the overall circuit configuration.

Moreover, this configuration, despite permitting time-division driving, permits sequential input of data as do static methods. This eliminates the need for such circuits for rearranging data as are required in conventional dynamic driving. Moreover, even if the number of divisions used in time-division driving is increased, the timing signals for time-division driving (internal strobe signals) are fed by way of a number of signal lines for control signals fewer than the number of divisions. This makes it possible to reduce the number of terminals of the ICs and the number of assembly steps thereof.

Moreover, the driver ICs 1 can store all the compensation data and select particular sets thereof for output. This makes it easy, when time-division driving is performed using the compensation data, to correct the outputs on the basis of the stored compensation data.

The light-emitting devices 22 may be arranged in any other manner than in a row; for example, they may be arranged in a zigzag line, or in two or more rows. The driver ICs 1 do not necessarily have to be arranged on one side of the light-emitting device 22, but may be arranged on both sides of the light-emitting devices 22.

The present invention is suitable for optical print heads in which, as described above one light-emitting device and one or more ICs for driving it form a unit and a plurality of such units are arranged in the same direction in which the light-emitting portions are arranged. However, the present invention is applicable also to optical print heads and similar printing devices that use such units as their basic building blocks.

Moreover, the present invention is applicable also in cases where a driver IC and a plurality of light-emitting devices driven by it form a unit and there is provided one such unit or a plurality of such units.

In this embodiment, the number (n) of drive circuits 12 of the IC 1 is smaller than the number (4×n) of light-emitting portions 26 of the light emitting device 22 driven by the IC 1. Since the drive circuit 12 occupies 50% or more of the area of the driver IC 1, by building the IC 1 with driver circuits 12 fewer than the light-emitting portions 26, it is possible to reduce the area of the driver IC 1.

Second Embodiment

Figure 10:
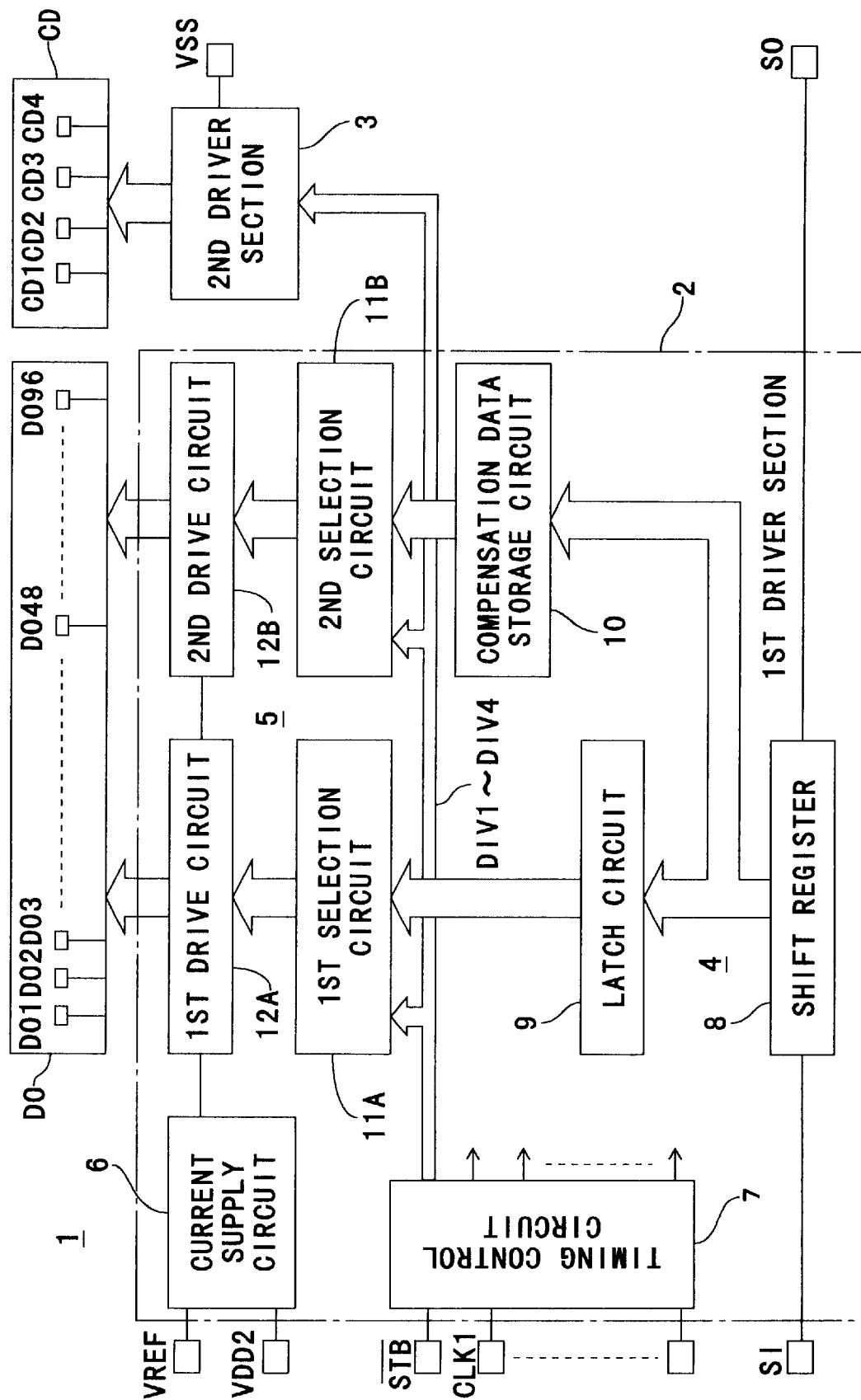
FIG. 10 is a circuit block diagram of the driver IC of the second to fifth embodiments.
Figure 11:
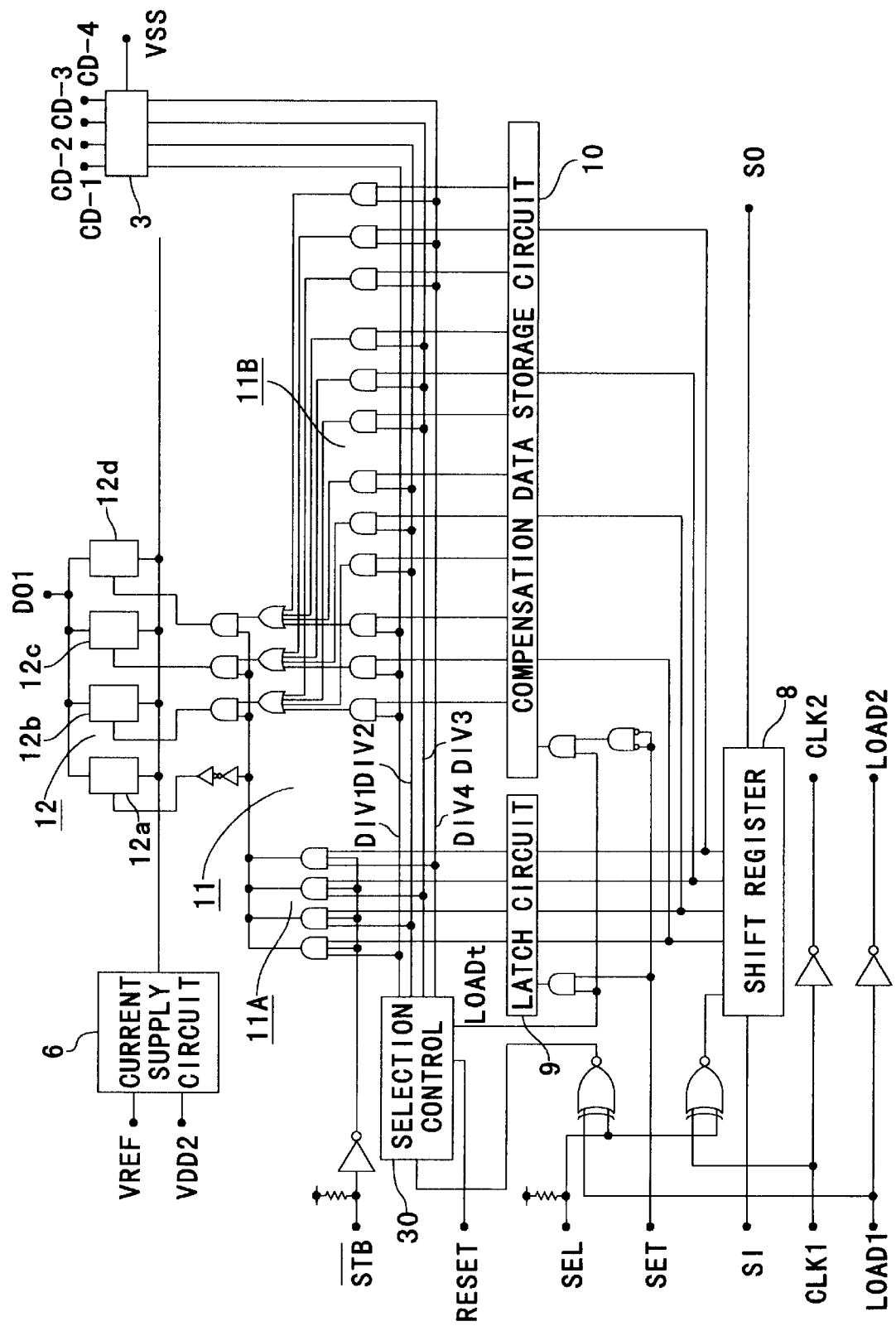
FIG. 11 is a circuit block diagram of a principal portion of the driver IC of the second embodiment

Next, a second embodiment of the invention will be described. FIG. 10 is a circuit block diagram showing the basic configuration of the driver IC of a second to a fifth embodiment. The configuration shown in FIG. 10 differs from that shown in FIG. 1 only in that the timing control circuit 7 feeds the first selection circuit 11A, the second selection circuit 11B, and the second driver section 3 with division timing signals DIV1 to DIV4 (described later); therefore, in FIG. 10, such circuit blocks as are found also in FIG. 1 are identified with the same reference numerals, and their descriptions will not be repeated. FIG. 11 is a circuit block diagram of a principal portion of the driver IC 1 of the second embodiment, specifically a portion, extracted from the circuit block diagram of FIG. 10, related to one output terminal DO1 among a plurality of output terminals DO1 to DO96. A selection control signal generating circuit 30 included in the timing control circuit 7 controls the opening/closing of the gates of the selection circuit 11, and feeds the division timing signals DIV1 to DIV4 to the second driver section 3. The latch circuit 9, on the basis of a load signal LOADt fed thereto from the selection control signal generating circuit 30, takes in, parallel, the data signals taken in by the shift register 8. In other respects, the configuration shown in FIG. 11 is the same as that shown in FIG. 2; therefore, in FIG. 11, such circuit blocks as are found also in FIG. 2 are identified with the same reference numerals, and their descriptions will not be repeated.

Figure 12:
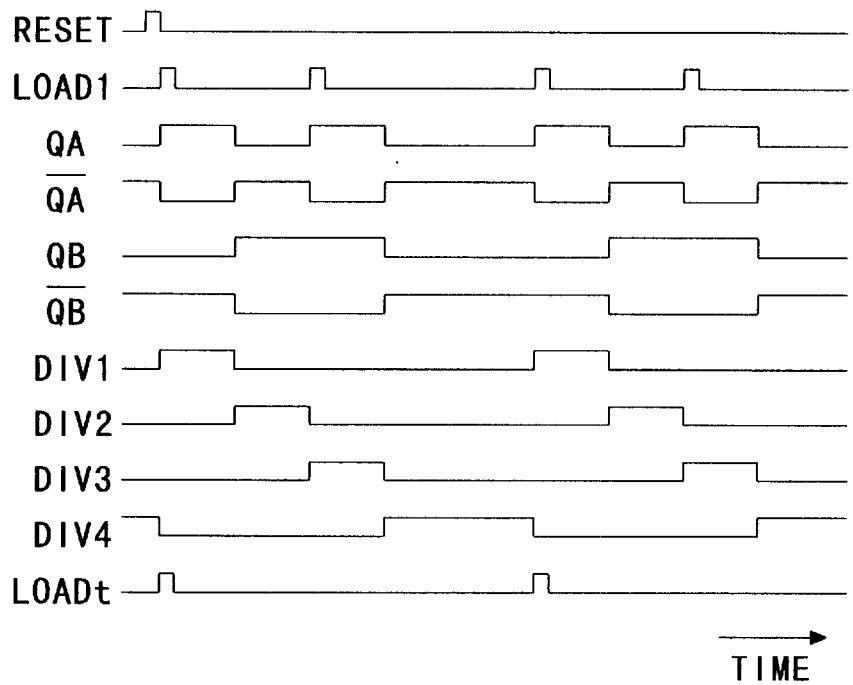
FIG. 12 is a waveform diagram showing the waveforms observed at relevant points in the second embodiment.
Figure 13:
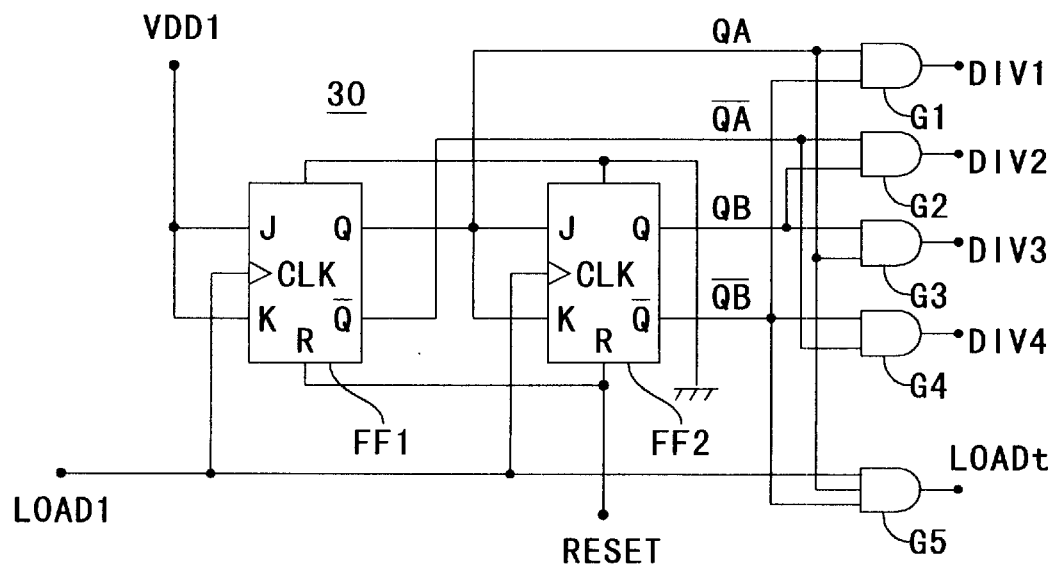
FIG. 13 is a circuit diagram showing a principal portion of FIG. 11.

As shown in a waveform diagram in FIG. 12, the selection control signal generating circuit 30 is a circuit for generating the division timing signals (DIV1 to DIV4) that are used to divide the period defined by the load signal LOADt representing the storage timing into a plurality of periods. As shown in FIG. 13, the selection control signal generating circuit 30 is composed of, for example, two flip-flops FF1 and FF2, a counter consisting of a plurality of (four) logic gate circuits G1 to G4 combined together, and a logic gate circuit G5. The logic gate circuit G5 is used to separate the load signal LOADt. Here, the control signal LOAD1 is a signal having the division timing signals (DIV1 to DIV4) superimposed on the load signal LOADt that defines the timing with which data signals are stored in the data signal storage circuit 4, and is fed in from outside by way of a signal line separate from the signal line by way of which the control signal (strobe signal) that defines the period for which light is emitted is fed in.

Specifically, the JK flip-flop FF1 receives at its input terminals J and K a supply voltage VDD1, which is at H level, receives at its clock input terminal CL the control signal (LOAD1), and receives at its reset input terminal R a reset signal RESET. The flip-flop FF1 outputs at its output terminal Q a signal QA, and outputs at its output terminal $\overline{Q}$ a signal $\overline{QA}$. The JK flip-flop FF2 receives at its input terminals J and K the signal QA, receives at its clock input terminal CL the control signal (LOAD1), and receives at its reset input terminal R the reset signal RESET. The flip-flop FF2 outputs at its output terminal Q a signal QB, and outputs at its output terminal $\overline{Q}$ a signal $\overline{QB}$. The logic gate circuit G1 performs AND operation on the signal QA and the signal $\overline{QB}$, and outputs the division m timing signal DIV1. The logic gate circuit G2 performs AND operation on the signal $\overline{QA}$ and the signal QB, and outputs the division timing signal DIV2. The logic gate circuit G3 performs AND operation on the signal QA and the signal QB, and outputs the division timing signal DIV3. The logic gate circuit G4 performs AND operation on the signal $\overline{QA}$ and the signal $\overline{QB}$, and outputs the division timing signal DIV4. The logic gate circuit G5 performs AND operation on the control signal (LOAD1), the signal QA, and the signal $\overline{QB}$, and outputs the load signal LOADt.

In this way, the selection control signal generating circuit 30 generates four division timing signals (DIV1 to DIV4) on the basis of a single control signal (LOAD1). This helps increase flexibility in the control achieved using the strobe signal STB (i.e. the adjustment of light emission period) as compared with cases where division timing signals are generated using the control signal (strobe signal STB) that defines the light emission period as in the first embodiment described previously. Moreover, the control signal (LOAD1) can be fed in by way of a number of signal lines fewer than the division timing signals. This makes it possible to reduce the number of terminals required to receive control signals from outside and thereby make the IC smaller, and in addition makes it possible to reduce the number of wires, such as those wire-bonded, for external connection.

In FIG. 13, the selection control signal generating circuit 30 is shown as being reset by the reset signal RESET fed from outside; however, it may be reset in synchronism with the input of data signals that correspond to one line. This is achieved, for example, by resetting the flip-flops FF1 and FF2 with a signal that is synchronous with the aforementioned load signal LOADt.

Next, with reference to FIG. 11, the flow of data will be described with respect to one output terminal DO1. As the division timing signals DIV1 to DIV4 turn to H level one after the next, among four AND gate circuits that are connected to those division timing signals DIV1 to DIV4, only the one connected to the division timing signal that is at H level at the moment is selected, and this AND gate circuit is opened by an internal strobe signal STB. As a result, the data (384 sets of on/off data that correspond to a whole IC 1) stored in the latch circuit 9 is selectively output through that AND gate circuit while the internal strobe signal STB is at H level. In the example shown in FIG. 11, as the division timing signals DIV1 to DIV4 turn to H level one after the next, the first to fourth sets of data within the IC are used one after the next to drive the drive circuit 12. On the other hand, in a similar manner, as the division timing signals DIV1 to DIV4 turn to H level one after the next, four sets of three AND gates are opened, and thus selected, one set after the next. As a result, the compensation data, consisting of sets of three-bit data, stored in the compensation data storage circuit 10 is selectively output through those AND gate circuits while the internal strobe signal STB is at H level. The outputs of the compensation data storage circuit 10 are fed to the drive circuit 12, where they selectively activate the three current amplifiers 12b to 12d.

Next, the second driver section 3 will be described. The second driver section 3 is a circuit for selectively switching one of the output terminals CD1 to CD4 to the ground potential VSS, and is so configured as to perform the switching with timing synchronous with the division timing signals DIV1 to DIV4. However, the second driver section 3 may be so configured as to perform the switching by the use of other signals synchronous with the timing of the selection performed by the selection circuit 11.

Figure 14:
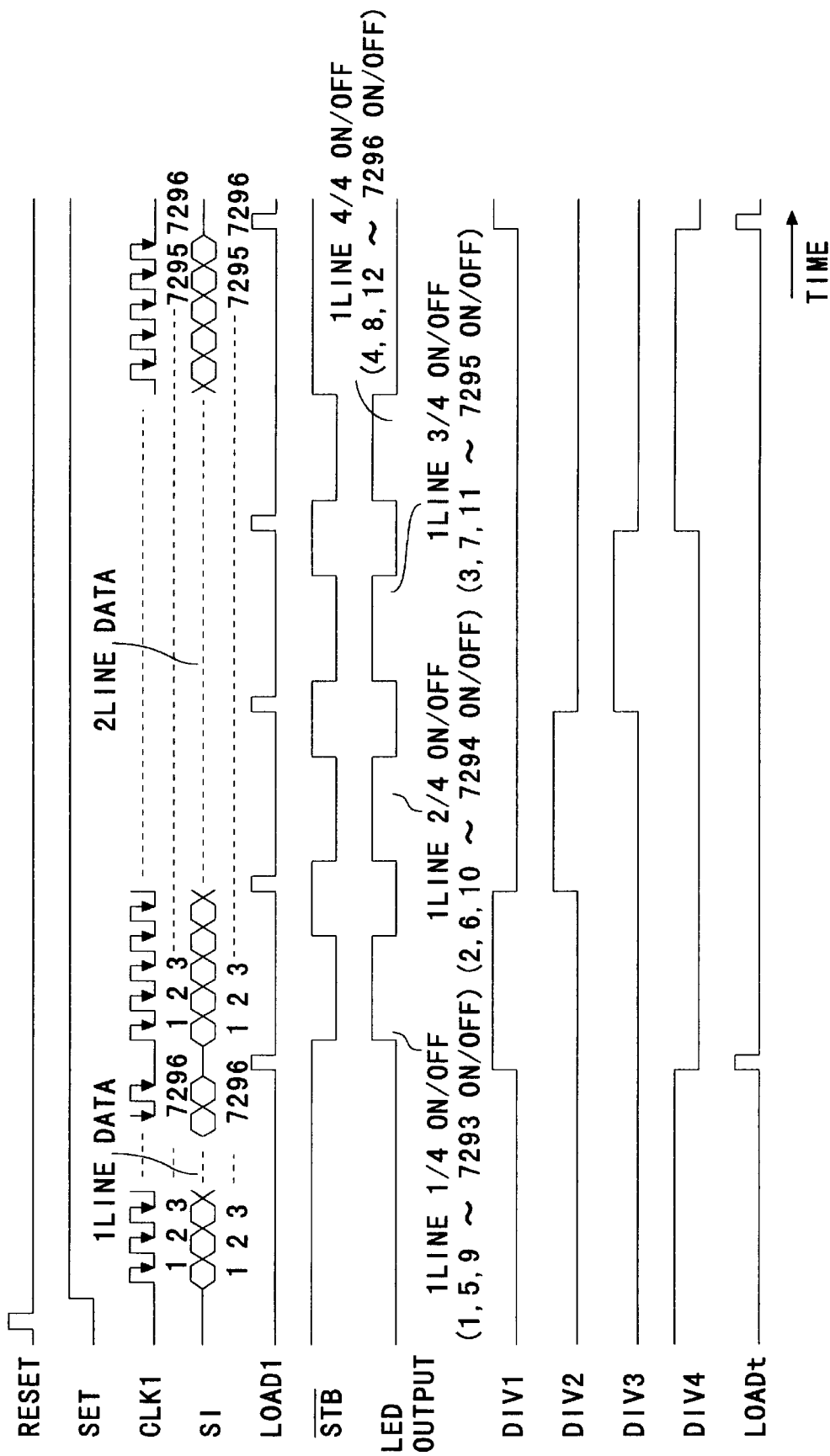
FIG. 14 is a timing chart of the second embodiment.

Next, the operation of the optical print head 20 described above, including the operation of the driver IC 1 described above, will be described with reference to, in addition to FIGS. 10 and 11, FIG. 9 described previously, which shows an example of the circuit configuration of the optical print head, and FIG. 14, which shows a timing chart. In the following descriptions, it is assumed that the compensation data to be stored in the storage circuit 10 has already been stored there.

First, the reset signal RESET is fed in to initialize relevant circuit blocks. Next, a set signal SET is turned from L level to H level. This brings the storage circuit 10 into a write-disabled state.

Data signals (7,296 signals) are sequentially fed to the data input terminal SI of the nineteenth driver IC 1, and are sequentially taken in by the shift registers 8 of the individual driver ICs 1 in synchronism with the clock signal CLK1.

Next, the load signal LOADt generated on the basis of the control signal LOAD1 is held at H level for a predetermined period. This causes the n×m data signals held in the shift registers 8 of the individual driver ICs 1 to be input. Here, at the trailing edge of the load signal LOADt, the latch circuits 9 are selected (latched), so that the n×m data signals taken in by the shift registers 8 are fed to and stored in the latch circuits 9.

On the other hand, immediately after the control signal LOAD1 turns from L level to H level, the division timing signal DIV1 rises from L level to H level to remain at H level until the control signal LOAD1 rises from L level to H level next time. When the control signal LOAD1 turns to H level next time, only the division timing signal DIV2 turns to H level. Likewise, thereafter, only the division timing signal DIV3, and then only DIV4, turns to H level on a one-at-a-time basis.

As the division timing signals DIV1 to DIV4 are switched in this way, the positions of the data signals that the selection circuit 11 selects from those stored in the latch circuit 9 and the storage circuit 10 for output are switched sequentially. The division timing signal DIV1 selects the first, fifth, ... and 7,293rd sets of data. The division timing signal DIV2 selects the second, sixth, ... and 7,294th sets of data. The division timing signal DIV3 selects the third, seventh, ... and 7,295th sets of data. The division timing signal DIV4 selects the fourth, eighth, ... and 7,296th sets of data.

Within the periods in which any of the division timing signals DIV1 to DIV4 is held at H level, the internal strobe signal STB, which indicates the period of light emission, is held at H level for a predetermined period. While the internal strobe signal STB is held at H level, the aforementioned data (with compensation data, consisting of sets of three-bit data, added thereto as required) is fed to the drive circuit 12. On the basis of the data signals and the compensation data added thereto, the drive circuit 12 selectively activates the four current amplifiers 12a to 12d so that their output currents are supplied via the output terminals DO to the individual separate electrodes 28 of the light-emitting devices 22. Here, as the external strobe signal $\overline{STB}$, instead of a signal that is held at one level (in this example, L level) in effective periods as shown in FIG. 14, it is also possible to use one or more alternating pulse signals that indicate effective periods by alternating between L and H levels at short intervals.

Now, it is possible to supply the separate electrodes 28 (the electrodes 28 are shown in FIG. 9) of all the light-emitting devices 22 with currents according to the data signals or compensation data. However, in this example, since only a quarter of the light-emitting portions 26 are grounded via the common electrodes 27, selectively only every fourth light-emitting portion 26 emits light.

The period for which the thus selected light-emitting portions 26 emit light is equal to the predetermined period for which the external strobe signal $\overline{STB}$ remains at L level. Thus, by controlling the period for which the external strobe signal $\overline{STB}$ is held at L level, it is possible to control the period for which the light-emitting portions 26 emit light.

By making one quarter after another of the light-emitting portions corresponding to one line emit light through time-division driving as described above, and performing this repeatedly, it is possible to achieve exposure of one frame.

By feeding the division timing signals DIV1 to DIV4 in a form superimposed on the signal LOADt for controlling the timing of data storage in this way, it is possible to feed the timing signals for time-division driving by way of signal lines separate from the signal line by way of which the strobe signal $\overline{STB}$ is fed to control the operation periods of the drive circuit 12. This helps simplify control using the strobe signal. Specifically, by using the signal line for the strobe signal exclusively for this signal, it is possible to simplify the data processing that is performed to adjust the density of the printed image by adjusting the periods of the strobe signal. Moreover, it is useful to keep the strobe signal independent in cases where the periods of the strobe signal is varied, or where a plurality of types of pulses with different periods are used in combination as the strobe signal, to control gradation by controlling printing periods.

In this embodiment, by feeding the division timing signals DIV1 to DIV4 in a form superimposed on the load signal LOADt, the division timing signals DIV1 to DIV4 are fed by way of signal lines separate from the signal line for feeding the external strobe $\overline{STB}$. Alternatively, it is also possible to feed the division timing signals DIV1 to DIV4 by way of signal lines separate from those for feeding the external strobe $\overline{STB}$ and the load signal LOADt.

Third Embodiment

Figure 15:
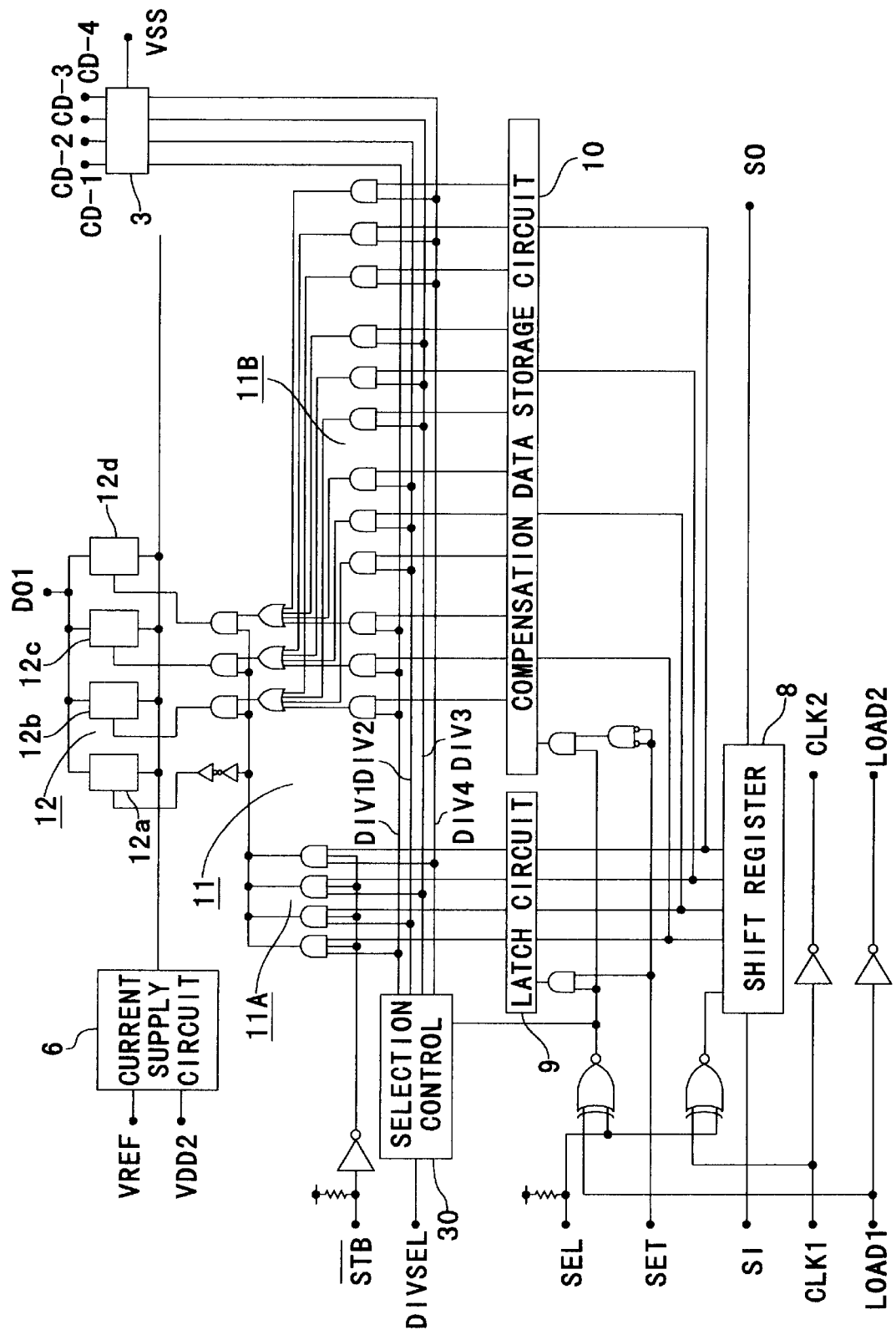
FIG. 15 is a circuit block diagram of a principal portion of the driver IC of the third embodiment.

Next, a third embodiment of the invention will be described. FIG. 15 is a circuit block diagram of a principal portion of the third embodiment, specifically a portion, extracted from the circuit block diagram of FIG. 10, related to one output terminal DO1 among a plurality of output terminals DO1 to DO96. The third embodiment differs from the second embodiment described previously and shown in FIG. 11 in that it uses a dedicated signal (control signal DIVSEL) as the control signal that is fed to the selection control signal generating circuit 30. In other respects, the configuration shown in FIG. 15 is the same as that shown in FIG. 11; therefore, in FIG. 15, such circuit blocks as are found also in FIG. 11 are identified with the same reference numerals, and their descriptions will not be repeated.

Figure 16:
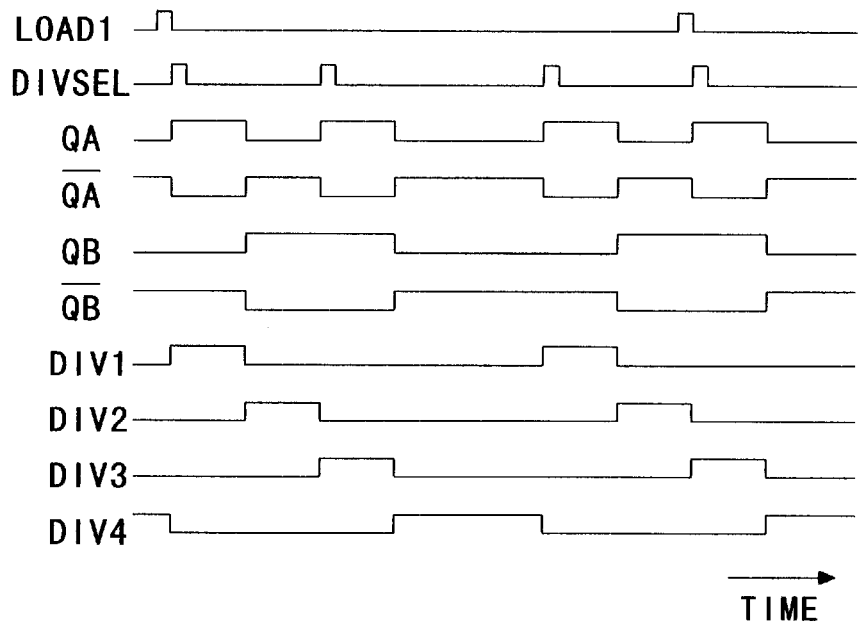
FIG. 16 is a waveform diagram showing the waveforms observed at relevant points in the third embodiment.

FIG. 16 is a waveform diagram showing the operation of the selection control signal generating circuit 30. The control signal DIVSEL has approximately the same timing as the control signal LOAD1 shown in FIG. 12 showing the second embodiment described previously. In this embodiment, the control signal LOAD1 is used not to generate the division timing signals DIV1 to DIV4, but to provide timing with which the latch circuit 9 and the compensation data storage circuit 10 take in data.

Figure 17:
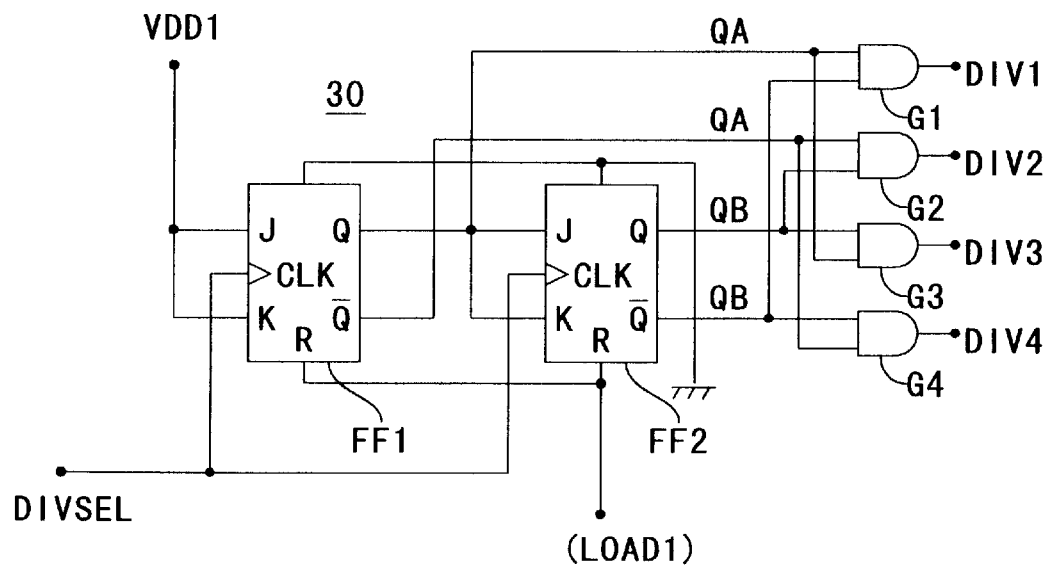
FIG. 17 is a circuit diagram showing a principal portion of FIG. 15.

FIG. 17 is a circuit diagram showing an example of the configuration of the selection control signal generating circuit 30. As shown in FIG. 16, the selection control signal generating circuit 30 is a circuit for generating the division timing signals (DIV1 to DIV4) that are used to divide the period defined by the control signal DIVSEL into a plurality of periods, and is composed of two flip-flops FF1 and FF2 and a counter consisting of a plurality of (four) logic gate circuits G1 to G4 combined together.

Specifically, the JK flip-flop FF1 receives at its input terminals J and K a supply voltage VDD1, which is at H level, receives at its clock input terminal CL the control signal (DIVSEL), and receives at its reset input terminal R the control signal LOAD1. The flip-flop FF1 outputs at its output terminal Q a signal QA, and outputs at its output terminal $\overline{Q}$ a signal $\overline{QA}$. The JK flip-flop FF2 receives at its input terminals J and K the signal QA, receives at its clock input terminal CL the control signal (DIVSEL), and receives at its reset input terminal R the control signal LOAD1. The flip-flop FF2 outputs at its output terminal Q a signal QB, and outputs at its output terminal $\overline{Q}$ a signal $\overline{QB}$. The logic gate circuit G1 performs AND operation on the signal QA and the signal $\overline{QB}$, and outputs the division timing signal DIV1. The logic gate circuit G2 performs AND operation on the signal $\overline{QA}$ and the signal QB, and outputs the division timing signal DIV2. The logic gate circuit G3 performs AND operation on the signal QA and the signal QB, and outputs the division timing signal DIV3. The logic gate circuit G4 performs AND operation on the signal $\overline{QA}$ and the signal $\overline{QB}$, and outputs the division timing signal DIV4.

In this way, the selection control signal generating circuit 30 generates four division timing signals (DIV1 to DIV4) on the basis of a single control signal (DIVSEL). Thus, the control signal (DIVSEL) can be fed in by way of a number of signal lines fewer than the division timing signals. This makes it possible to reduce the number of terminals required to receive control signals from outside and thereby make the IC smaller, and in addition makes it possible to reduce the number of wires, such as those wire-bonded, for external connection.

Figure 18:
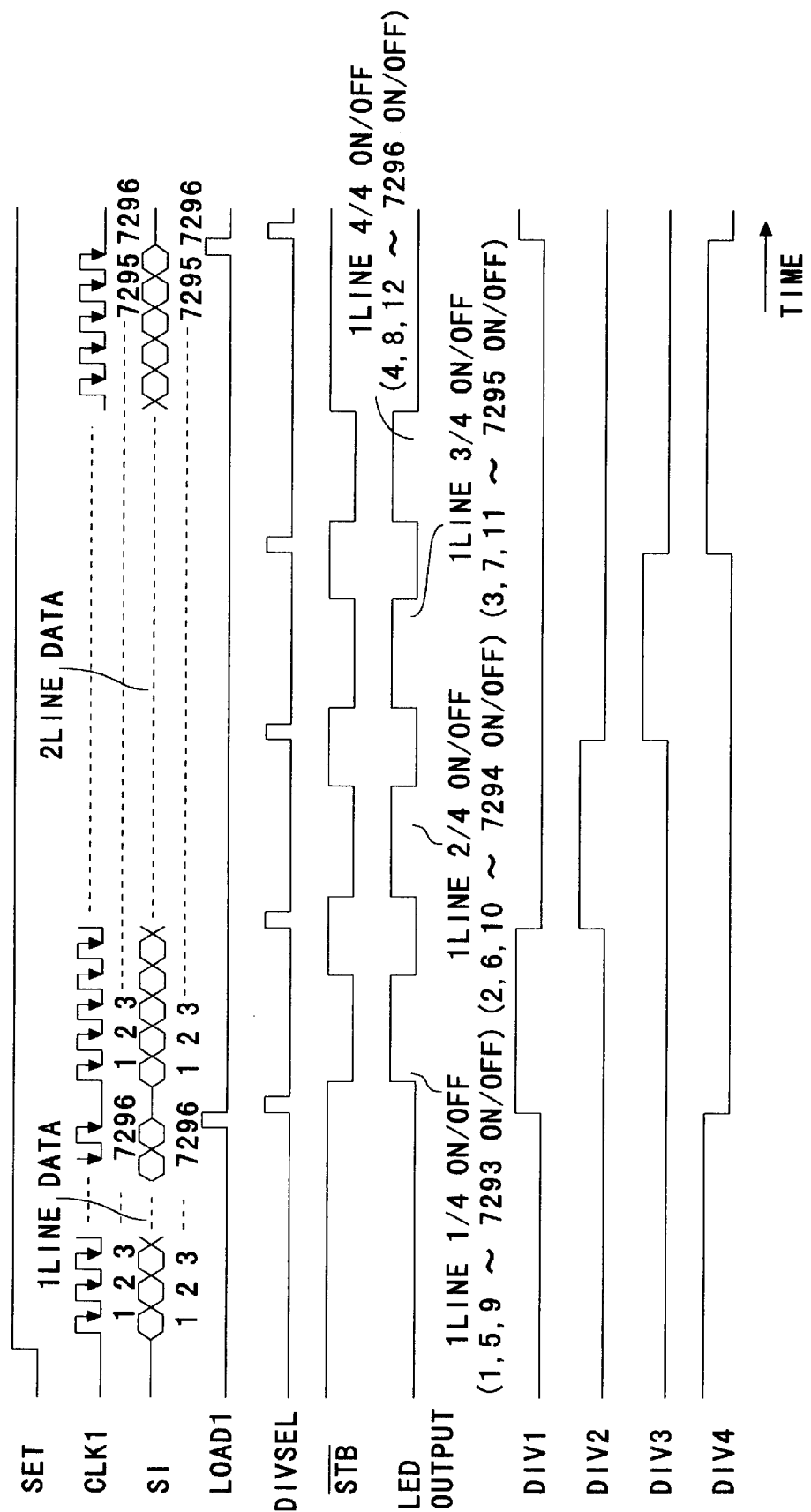
FIG. 18 is a timing chart of the third embodiment.

Next, the operation of the optical print head 20 described above, including the operation of the driver IC 1 described above, will be described with reference to, in addition to FIGS. 10 and 15, FIG. 9 described previously, which shows an example of the circuit configuration of the optical print head 20, and FIG. 18, which shows a timing chart. In the following descriptions, it is assumed that the compensation data to be stored in the storage circuit 10 has already been stored there.

Data signals (7,296 signals) are sequentially fed to the data input terminal SI of the nineteenth driver IC 1, and are sequentially taken in by the shift registers 8 of the individual driver ICs 1 in synchronism with the clock signal CLK1.

Next, at the trailing edge of the load signal LOAD1, the latch circuits 9 are selected (latched), so that the n×m data signals taken in by the shift registers 8 are fed to and stored in the latch circuits 9.

On the other hand, immediately after the trailing edge of the load signal LOAD1, the control signal DIVSEL is held at H level for a predetermined period so that the division timing signal DIV1 turns from L level to H level to remain at H level until the control signal DIVSEL rises from L level to H level next time. When the control signal DIVSEL rises to H level next time, only the division timing signal DIV2 turns to H level. Likewise, thereafter, only the division timing signal DIV3, and then only DIV4, turns to H level on a one-at-a-time basis.

As the division timing signals DIV1 to DIV4 are switched in this way, the positions of the data signals that the selection circuit 11 selects from those stored in the latch circuit 9 and the storage circuit 10 for output are switched sequentially. The division timing signal DIV1 selects the first, fifth, . . . and 7,293rd sets of data. The division timing signal DIV2 selects the second, sixth, . . . and 7,294th sets of data. The division timing signal DIV3 selects the third, seventh, . . . and 7,295th sets of data. The division timing signal DIV4 selects the fourth, eighth, . . . and 7,296th sets of data.

Within the periods in which any of the division timing signals DIV1 to DIV4 is held at H level, the internal strobe signal STB, which indicates the period of light emission, is held at H level for a predetermined period. While the internal strobe signal STB is held at H level, the aforementioned data (with compensation data, consisting of sets of three-bit data, added thereto as required) is fed to the drive circuit 12. On the basis of the data signals and the compensation data added thereto, the drive circuit 12 selectively activates the four current amplifiers 12a to 12d so that their output currents are supplied via the output terminals DO to the individual separate electrodes 28 of the light-emitting devices 22. Here, as the external strobe signal $\overline{STB}$, instead of a signal that is held at one level (in this example, L level) in effective periods as shown in FIG. 15, it is also possible to use one or more alternating pulse signals that indicate effective periods by alternating between L and H levels at short intervals.

Now, it is possible to supply the separate electrodes 28 (the electrodes 28 are shown in FIG. 9) of all the light-emitting devices 22 with currents according to the data signals or compensation data. However, in this example, since only a quarter of the light-emitting portions 26 are grounded via the common electrodes 27, selectively only every fourth light-emitting portion 26 emits light.

The period for which the thus selected light-emitting portions 26 emit light is equal to the predetermined period for which the external strobe signal $\overline{STB}$ remains at L level. Thus, by controlling the period for which the external strobe signal $\overline{STB}$ is held at L level, it is possible to control the period for which the light-emitting portions 26 emit light.

By making one quarter after another of the light-emitting portions corresponding to one line emit light through time-division driving as described above, and performing this repeatedly, it is possible to achieve exposure of one frame.

Using a dedicated signal to generate the timing division signals DIV1 to DIV4 as in this embodiment requires additional provision of a terminal and a signal line dedicated to that signal, but helps reduce or eliminate the restrictions imposed on other control signals as compared with cases where, as in the first embodiment described previously, the internal strobe signals STB1 to STB4 are generated on the basis of the external strobe signal $\overline{STB}$ (for adjusting the driving periods of the drive circuit 12) or where, as in the second embodiment described previously, the division timing signals DIV1 to DIV4 are generated on the basis of the load signal LOAD1 (for providing the storage timing of the storage circuit 4). This ensures reliable execution of more basic control.

Fourth Embodiment

Figure 19:
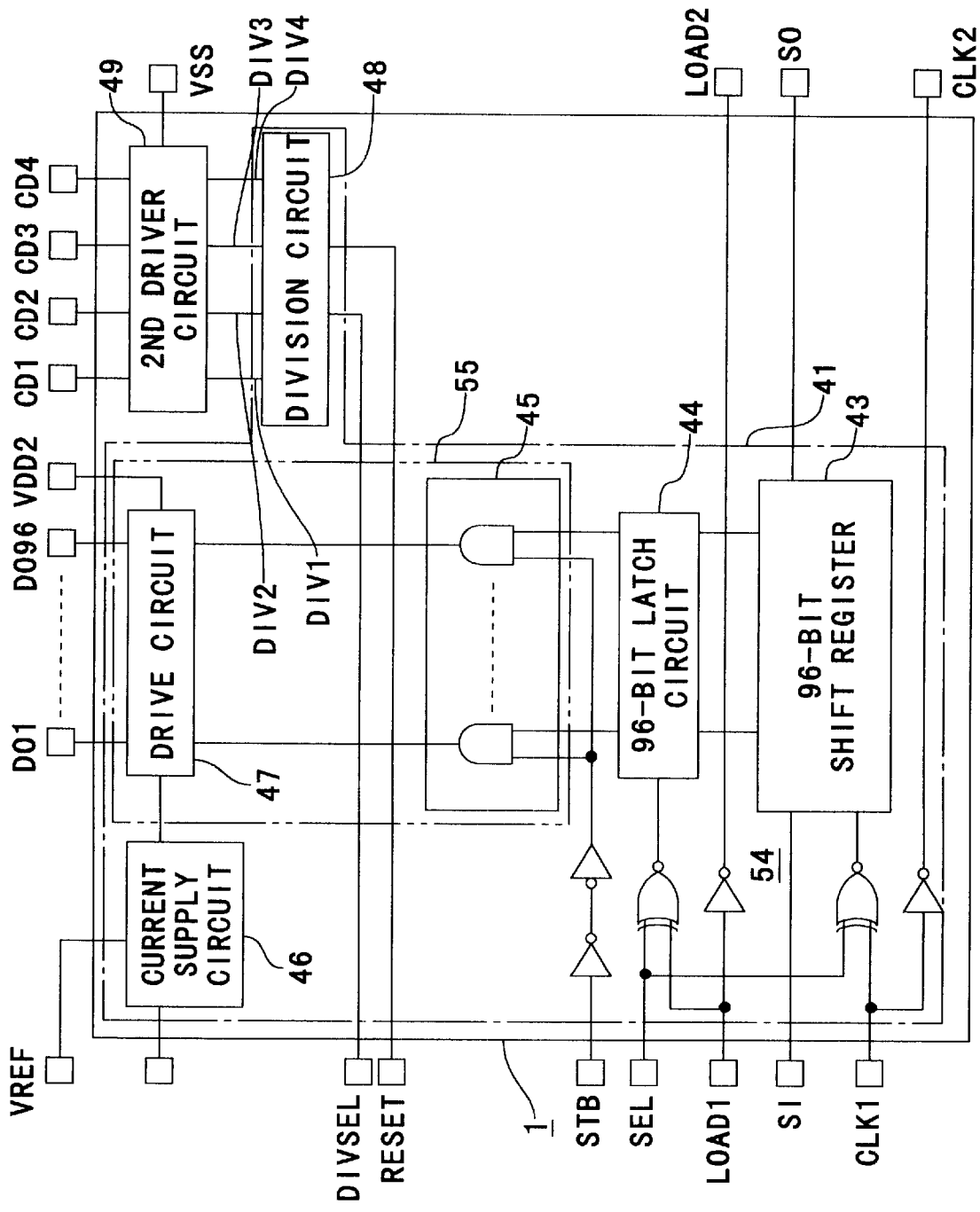
FIG. 19 is a circuit block diagram of a principal portion of the driver IC of the fourth embodiment.

Next, a fourth embodiment of the invention will be described. FIG. 19 is a circuit block diagram of the driver IC of the fourth embodiment. The driver IC 1 is provided with: a separate terminal section DO consisting of a plurality of (n) output terminals DO1 to DO96 for driving a device; a first driver section 41, connected to the individual output terminals DO1 to DO96, for feeding predetermined current outputs, as driving signals, to those output terminals DO1 to DO96; a common terminal section CD consisting of a plurality of (m) output terminals CD1 to CD4 for group selection; and a second driver section 49, connected to the individual output terminals CD1 to CD4, for selectively switching those output terminals CD1 to CD4 to one of the supply power potentials, for example to the ground potential VSS. It is to be understood that, although the following descriptions deal with a case where n=96 and m=4, the present invention is not limited to any specific numbers for n and m.

The first driver section 41 is provided with: a data signal storage circuit 54 for temporarily storing serial input data signals fed thereto sequentially via a data input terminal SI; a driver circuit 55 for outputting driving signals to the individual output terminals DO1 to DO96 on the basis of the data signals output from the data signal storage circuit 54 in a plurality of steps; a current supply circuit 46 for supplying a constant current to the driver circuit 55; and a division circuit 48 for feeding predetermined timing signals to the second driver section 49.

The data signal storage circuit 54 is provided with: a shift register 43 of an n (96)-bit type that, in synchronism with a clock signal CLK1, takes in the data signals input serially via the data input terminal SI and outputs them serially via a data output terminal SO; and a latch circuit 44 of an n (96)-bit type that, on the basis of a load signal LOAD1, takes in, parallel, the data signals taken in by the shift register 43.

In cases where, for example, each data signal consists of a plurality of bits, the configuration of the shift register 43, the latch circuit 44, and other relevant circuits may be modified accordingly. For example, the shift register 43 may be built as a memory the access to which is controlled by the use of addresses.

The driver circuit 55 is provided with: a logic gate circuit 45, consisting of n (96) AND gate circuits to which the data signals and a strobe signal STB are fed, that controls, by the use of the strobe signal, the period in which the n (96) data signals output from the latch circuit 44 are permitted passage; and a drive circuit 47 of an n (96)-bit type that outputs constant currents via the output terminals DO1 to DO96 on the basis of the outputs of those logic gate circuits 45. The drive circuit 47 is provided with current amplifiers (not shown) one for each of the output terminals DO. These current amplifiers are each supplied with a current from a current supply circuit 46, and output a current of 4 mA when fed with an "ON" data signal through the corresponding logic gate circuit 45.

Figure 20:
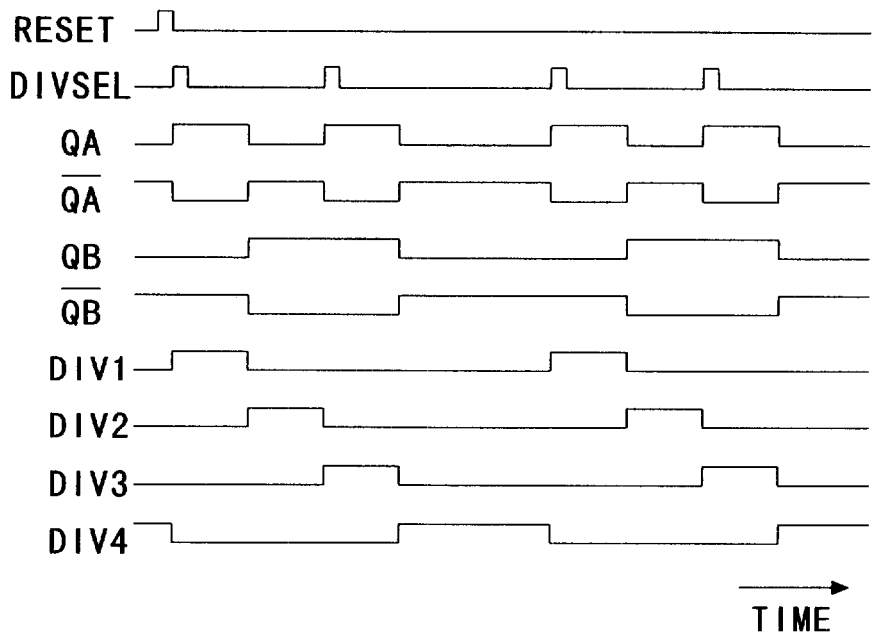
FIG. 20 is a waveform diagram showing the waveforms observed at relevant points in the fourth embodiment.
Figure 21:
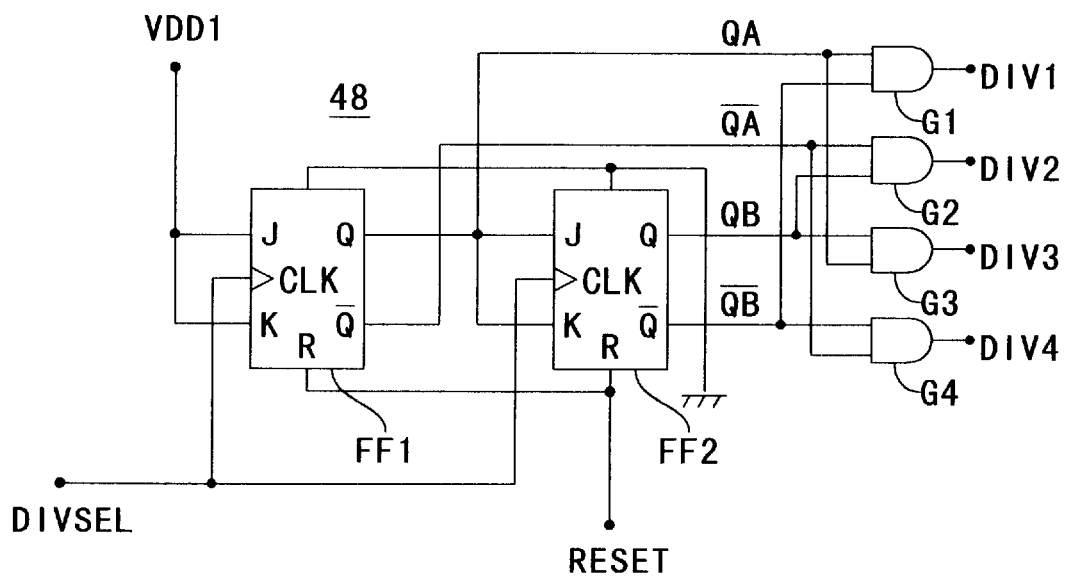
FIG. 21 is a circuit block diagram showing a principal portion of the fourth embodiment.

FIG. 21 is a circuit diagram of the division circuit 48. The division circuit 48 is configured in the same manner as the selection control signal generating circuit 30 (FIG. 17) of the driver IC 1 of the third embodiment except that the flip-flops FF1 and FF2 receive at their reset input terminals R a reset signal RESET from outside; therefore, in FIG. 20, such circuit blocks as are found also in FIG. 17 are identified with the same reference numerals, and their descriptions will not be repeated.

FIG. 20 is a waveform diagram showing the operation of the division circuit 48. After being reset with the reset signal RESET, the division circuit 48 turns only the division timing signal DIV1 to H level at the rising edge of the control signal DIVSEL and keeps it at H level until the control signal DIVSEL rises next time. When the control signal DIVSEL rises next time, the division circuit 48 turns only the division timing signal DIV2 to H level. Likewise, thereafter, the division circuit 48 turns only the division timing signal DIV3, and then only DIV4, to H level on a one-at-a-time basis.

Figure 22:
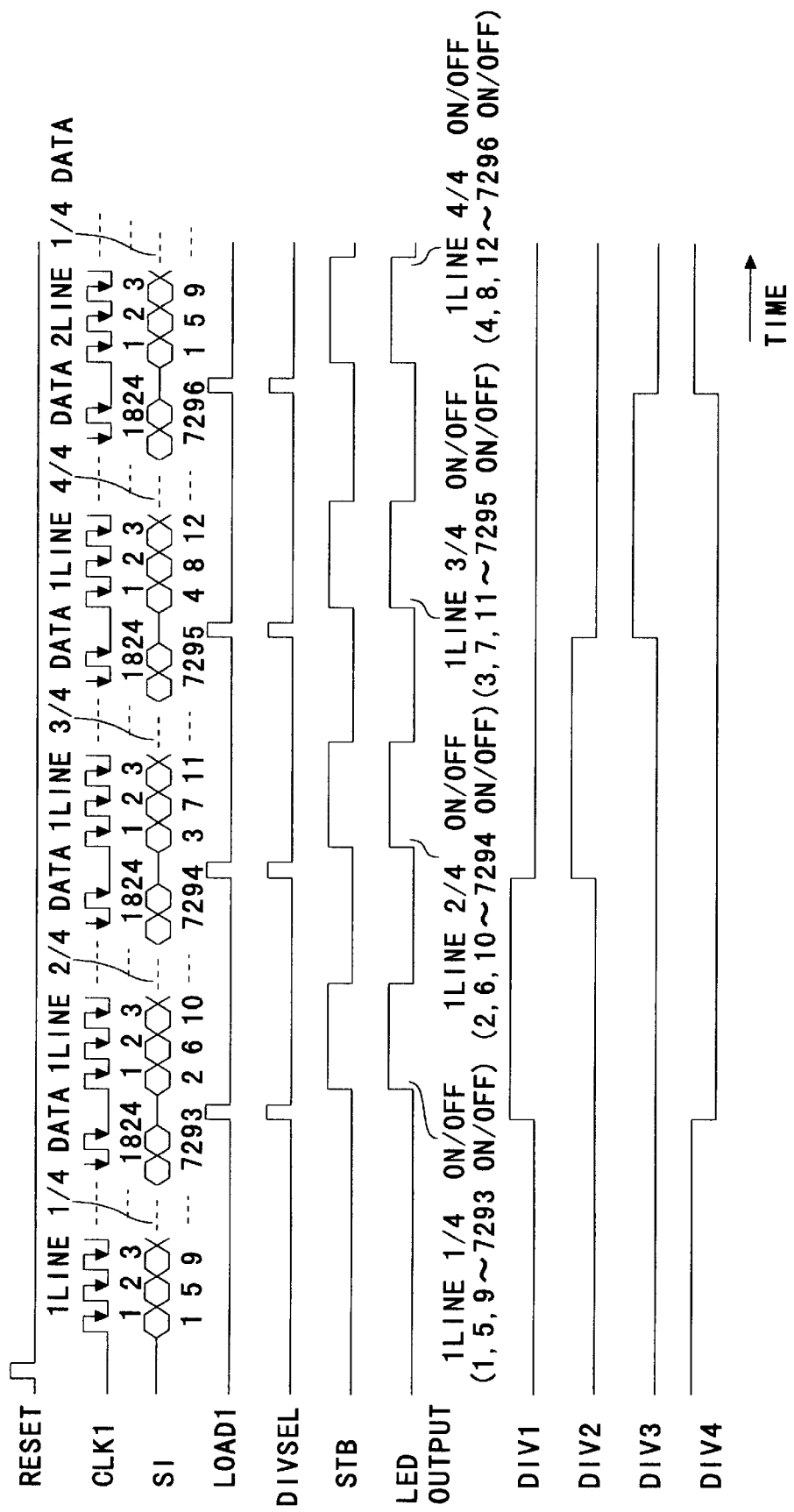
FIG. 22 is a timing chart of the fourth embodiment.

Next, the operation of the optical print head 20 described above, including the operation of the driver IC 1 described above, will be described with reference to, in addition to FIG. 19, FIG. 9 described previously, which shows an example of the circuit configuration of the optical print head, and FIG. 22, which shows a timing chart.

First, the reset signal RESET is fed in to initialize relevant circuit blocks. Then, 1,824 data signals (#1, #5, #9, ... and #7293) are sequentially fed to the data input terminal SI of the nineteenth driver IC 1, and are sequentially taken in by the shift registers 43 of the individual driver ICs 1 in synchronism with the clock signal CLK1.

Next, the control signal LOAD1 is held at H level for a predetermined period. This causes the n data signals held in the shift registers 43 of the individual driver ICs 1 to be input. Here, at the trailing edge of the control signal LOAD1, the latch circuits 44 are selected (latched), so that the n data signals taken in by the shift registers 43 are fed to and stored in the latch circuits 44. Immediately thereafter, the control signal DIVSEL rises from L level to H level and, after the lapse of a predetermined time, returns to L level. When the control signal DIVSEL rises, the timing control circuit 48 turns only the division timing signal DIV1 to H level.

Thereafter, the strobe signal STB is held at H level for a predetermined period. While the strobe signal STB is held at H level, the aforementioned data is fed to the drive circuit 47. On the basis of the data signals, the drive circuit 47 activates the current amplifiers (not shown) so that their output currents are supplied via the output terminals DO to the individual separate electrodes 28 of the light-emitting devices 22. Here, as the strobe signal STB, instead of a signal that is held at one level (in this example, H level) in effective periods as shown in FIG. 21, it is also possible to use one or more alternating pulse signals that indicate effective periods by alternating between L and H levels at short intervals.

After the control signal LOAD1 falls and the latch circuits 44 select the 1,824 data signals (#1, #5, #9, . . . and #7293) as described above, then 1,824 data signals (#2, #6, #10, . . . and #7294) are sequentially fed to the data input terminal SI of the nineteenth driver IC 1 in synchronism with the clock signal CLK1. These 1,824 data signals (#2, #6, #10, . . . and #7294) are then sequentially taken in by the shift registers 43 in synchronism with the clock signal CLK1.

Next, the control signal LOAD1 is held at H level for a predetermined period. This causes the n data signals held in the shift registers 43 of the individual driver ICs 1 to be input. Here, at the trailing edge of the control signal LOAD1, the n data signals taken in by the shift registers 43 are fed to and stored in the latch circuits 44. Immediately thereafter, the control signal DIVSEL rises from L level to H level and, after the lapse of a predetermined time, returns to L level. When the control signal DIVSEL rises, the timing control circuit 48 turns only the division timing signal DIV2 to H level.

Thereafter, the strobe signal STB is held at H level for a predetermined period. While the strobe signal STB is held at H level for the predetermined period, the aforementioned data is fed to the drive circuit 47. On the basis of the data signals, the drive circuit 47 activates the current amplifiers (not shown) so that their output currents are supplied via the output terminals DO to the individual separate electrodes 28 of the light-emitting devices 22.

After the control signal LOAD1 falls and the latch circuits 44 select the 1,824 data signals (#2, #6, #10, . . . and #7294) as described above, then 1,824 data signals (#3, #7, #11, . . . and #7295) are sequentially fed to the data input terminal SI of the nineteenth driver IC 1 in synchronism with the clock signal CLK1. These 1,824 data signals (#3, #7, #11, . . . and #7295) are then sequentially taken in by the shift registers 43 in synchronism with the clock signal CLK1.

Next, the control signal LOAD1 is held at H level for a predetermined period. This causes the n data signals held in the shift registers 43 of the individual driver ICs 1 to be input. Here, at the trailing edge of the control signal LOAD1, the n data signals taken in by the shift registers 43 are fed to and stored in the latch circuits 44. Immediately thereafter, the control signal DIVSEL rises from L level to H level and, after the lapse of a predetermined time, returns to L level. When the control signal DIVSEL rises, the timing control circuit 48 turns only the division timing signal DIV3 to H level.

Thereafter, the strobe signal STB is held at H level for a predetermined period. While the strobe signal STB is held at H level for the predetermined period, the aforementioned data is fed to the drive circuit 47. On the basis of the data signals, the drive circuit 47 activates the current amplifiers (not shown) so that their output currents are supplied via the output terminals DO to the individual separate electrodes 28 of the light-emitting devices 22.

After the control signal LOAD1 falls and the latch circuits 44 select the 1,824 data signals (#3, #7, #11, . . . and #7295) as described above, then 1,824 data signals (#4, #8, #12, . . . and #7296) are sequentially fed to the data input terminal SI of the nineteenth driver IC 1 in synchronism with the clock signal CLK1. These 1,824 data signals (#4, #8, #12, . . . and #7296) are then sequentially taken in by the shift registers 43 in synchronism with the clock signal CLK1.

Next, the control signal LOAD1 is held at H level for a predetermined period. This causes the n data signals held in the shift registers 43 of the individual driver ICs 1 to be input. Here, at the trailing edge of the control signal LOAD1, the n data signals taken in by the shift registers 43 are fed to and stored in the latch circuits 44. Immediately thereafter, the control signal DIVSEL rises from L level to H level and, after the lapse of a predetermined time, returns to L level. When the control signal DIVSEL rises, the timing control circuit 48 turns only the division timing signal DIV4 to H level.

Thereafter, the strobe signal STB is held at H level for a predetermined period. While the strobe signal STB is held at H level for the predetermined period, the aforementioned data is fed to the drive circuit 47. On the basis of the data signals, the drive circuit 47 activates the current amplifiers (not shown) so that their output currents are supplied via the output terminals DO to the individual separate electrodes 28 of the light-emitting devices 22.

After the control signal LOAD1 falls and the latch circuits 44 select the 1,824 data signals (#4, #8, #12, . . . and #7296) as described above, then, from the next line, 1,824 data signals (#1, #5, #9, . . . and #7293) are sequentially fed to the data input terminal SI of the nineteenth driver IC 1 in synchronism with the clock signal CLK1. Thereafter, the driver ICs 1 repeat, for the second and the following lines, the same operations that it performed for the data of the first line. By performing selective light emission in this way for each line, and performing that repeatedly, it is possible to achieve exposure of one frame.

Figure 23:
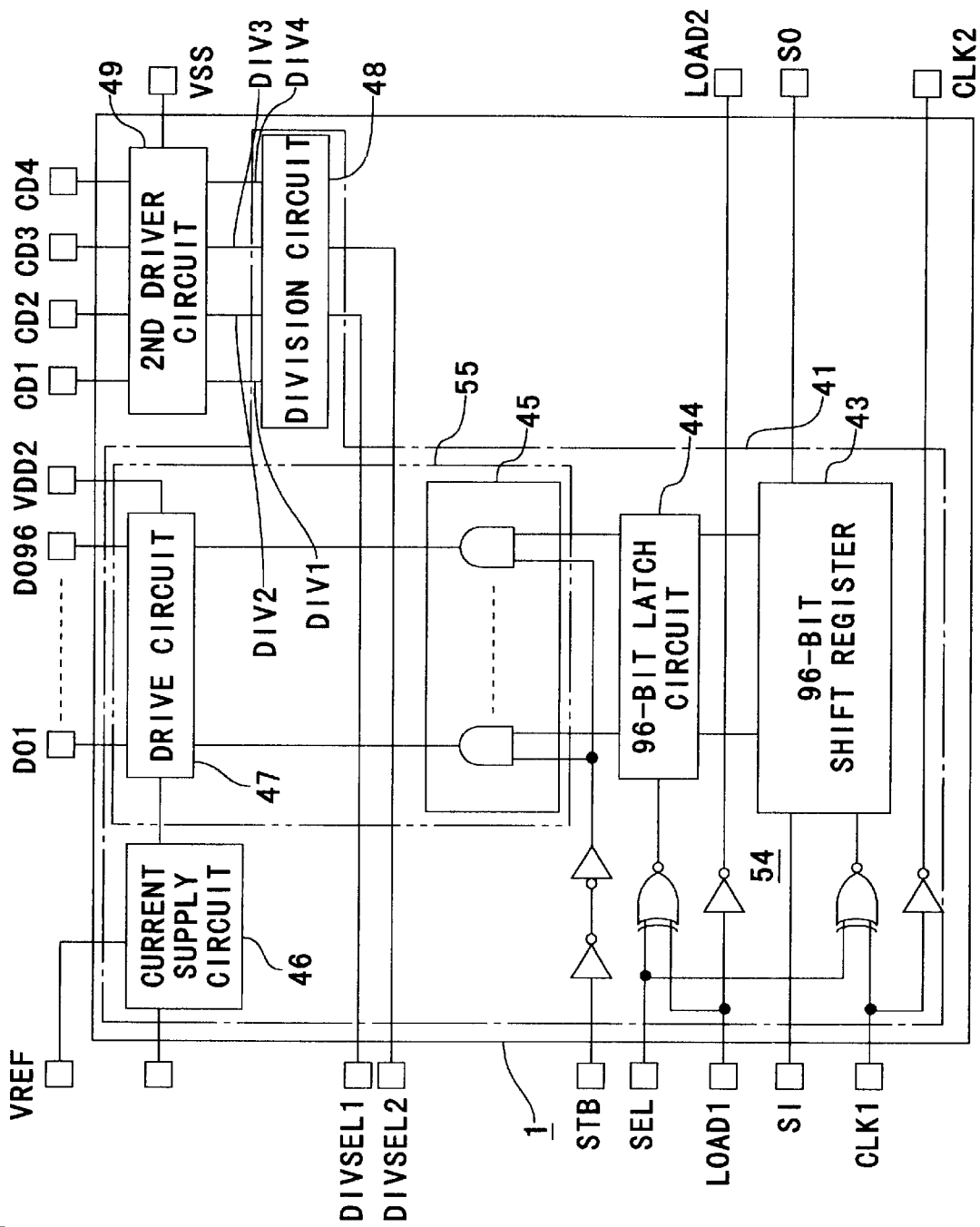
FIG. 23 is a circuit block diagram showing a principal portion of the driver IC of the fifth embodiment.

As described above, even if the number of divisions used in time-division driving is increased, the timing signals for time-division driving can be fed by way of a number of signal lines for control signals fewer than the number of divisions. This makes it possible to reduce the number of terminals of the ICs and the number of assembly steps thereof Fifth Embodiment Next, a fifth embodiment of the invention will be described. FIG. 23 is a circuit block diagram of the driver IC of the fifth embodiment. The driver IC 1 of this embodiment receives two control signals DIVSEL1 and DIVSEL2 instead of the control signal DIVSEL used in the fourth embodiment, and accordingly the division circuit 48 has a different internal configuration from the division circuit 48 of the driver IC 1 (FIG. 19) of the fourth embodiment described previously. In other respects, the configuration of the fifth embodiment is the same as that of the fourth embodiment described previously; therefore, in FIG. 23, such circuit blocks as are found also in FIG. 19 are identified with the same reference numerals, and their descriptions will not be repeated.

Figure 24:
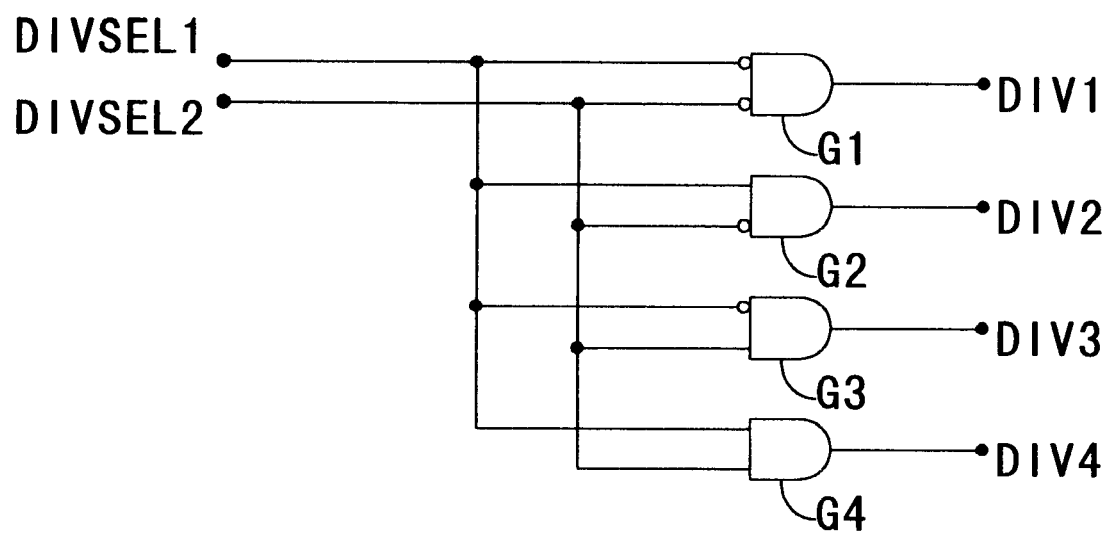
FIG. 24 is a circuit block diagram showing a principal portion of the fifth embodiment.

FIG. 24 is a circuit diagram of the division circuit 48. A logic gate circuit G1 performs AND operation on the inverse of the control signal DIVSEL1 and the inverse of the control signal DIVSEL2 to output the division timing signal DIV1. A logic gate circuit G2 performs AND operation on the control signal DIVSEL1 and the inverse of the control signal DIVSEL2 to output the division timing signal DIV2. A logic gate circuit G3 performs AND operation on the inverse of the control signal DIVSEL1 and the control signal DIVSEL2 to output the division timing signal DIV3. A logic gate circuit G4 performs AND operation on the control signal DIVSEL1 and the control signal DIVSEL2 to output the division timing signal DIV4.

As shown in Table 1, when the control signal DIVSEL1 is at H level and the control signal DIVSEL2 is at H level, the division circuit 48 turns only the division timing signal DIV4 to H level while keeping the other division timing signals DIV1 to DIV3 at L level. When the control signal DIVSEL1 is at L level and the control signal DIVSEL2 is at H level, the division circuit 48 turns only the division timing signal DIV3 to H level while keeping the other division timing signals DIV1, DIV2, and DIV4 at L level. When the control signal DIVSEL1 is at H level and the control signal DIVSEL2 is at L level, the division circuit 48 turns only the division timing signal DIV2 to H level while keeping the other division timing signals DIV1, DIV3, and DIV4 at L level. When the control signal DIVSEL1 is at L level and the control signal DIVSEL2 is at L level, the division circuit 48 turns only the division timing signal DIV1 to H level while keeping the other division timing signals DIV2 to DIV4 at L level. Thus, by giving the control signals DIVSEL1 and DIVSEL2 appropriate levels, it is possible to control the division timing signals DIV1 to DIV4 and thereby select the desired group freely.

TABLE 1

| DIVSEL1 | DIVSEL2 | Selected |
| --- | --- | --- |
| H | H | DIV4 |
| L | H | DIV3 |
| H | L | DIV2 |
| L | L | DIV1 |

Figure 25:
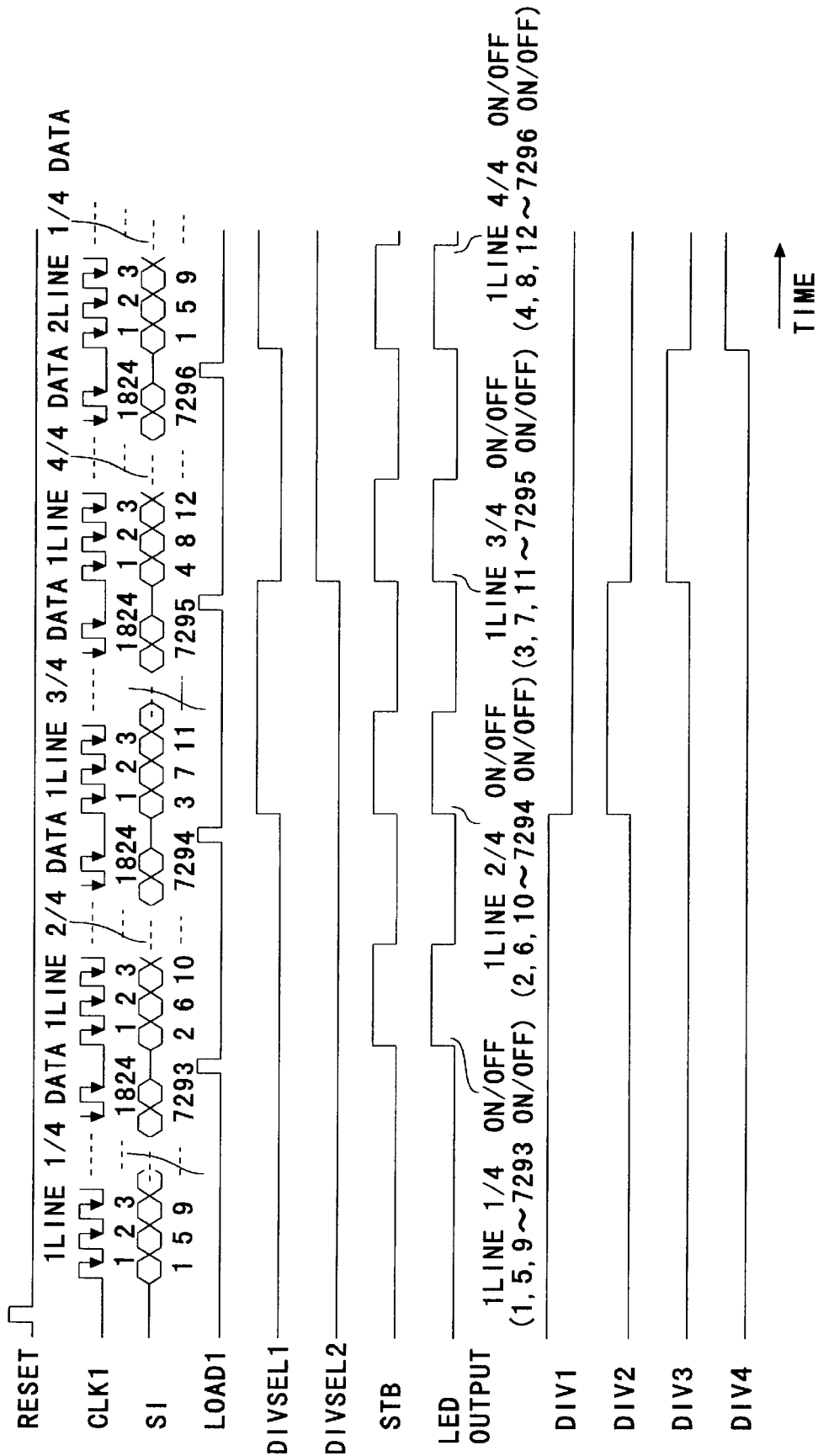
FIG. 25 is a timing chart of the fifth embodiment.

Next, the operation performed by the optical print head 20, including the driver IC 1, when groups are sequentially selected in the order of the division timing signals DIV1 to DIV4 will be described with reference to, in addition to FIG. 23, FIG. 9 described previously, which shows an example of the circuit configuration of the optical print head, and FIG. 25, which shows a timing chart. After the reset signal RESET is fed in to initialize relevant circuit blocks, as in the fourth embodiment, first, 1,824 data signals (#1, #5, #9, . . . and #7293) are sequentially fed to the data input terminal SI of the nineteenth driver IC 1, and are taken in by the shift registers 43 of the individual driver ICs 1.

Then, the control signal LOAD1 causes the data signals (#1, #5, #9, . . . and #7293) held in the shift registers 43 of the individual driver ICs 1 to be latched by the latch circuits 44. At this time, the control signals DIVSEL1 and DIVSEL2 are both held at L level, and thus the division circuit 48 turns only the division timing signal DIV1 to H level while keeping the other division timing signals DIV2 to DIV4 at L level. Accordingly, when the strobe signal STB is held at H level for a predetermined period, the division timing signal DIV1 selects the corresponding group and the driver ICs 1 drive the light-emitting devices 22 (the light-emitting devices 22 are shown in FIG. 9). Meanwhile, 1,824 data signals (#2, #6, #10, . . . and #7294) are sequentially fed to the data input terminal SI of the nineteenth driver IC 1, and are taken in by the shift registers 43 of the individual driver ICs 1.

Next, the control signal LOAD1 causes the data signals (#2, #6, #10, . . . and #7294) held in the shift registers 43 of the individual driver ICs 1 to be latched by the latch circuits 44, and then the strobe signal STB causes those data signals to be fed to the drive circuits 47. This time, the control signal DIVSEL1 has previously turned to H level and the control signal DIVSEL2 to L level; thus only the division timing signal DIV2 turns to H level and the other division timing signals DIV1, DIV3 and DIV4 remains at L level. Accordingly, the division timing signal DIV2 selects the corresponding group, and the driver ICs 1 drive the light-emitting devices 22. Meanwhile, 1,824 data signals (#3, #7, #11, . . . and #7295) are sequentially fed to the data input terminal SI of the nineteenth driver IC 1, and are taken in by the shift registers 43 of the individual driver ICs 1.

Next, the control signal LOAD1 causes the data signals (#3, #7, #11, . . . and #7295) held in the shift registers 43 of the individual driver ICs 1 to be latched by the latch circuits 44, and then the strobe signal STB causes those data signals to be fed to the drive circuits 47. This time, the control signal DIVSEL1 has previously turned to L level and the control signal DIVSEL2 to H level; thus only the division timing signal DIV3 turns to H level and the other division timing signals DIV1, DIV2 and DIV4 remains at L level. Accordingly, the division timing signal DIV3 selects the corresponding group, and the driver ICs 1 drive the light-emitting devices 22. Meanwhile, 1,824 data signals (#4, #8, #12, . . . and #7296) are sequentially fed to the data input terminal SI of the nineteenth driver IC 1, and are taken in by the shift registers 43 of the individual driver ICs 1.

Next, the control signal LOAD1 causes the data signals (#4, #8, #12, . . . and #7296) held in the shift registers 43 of the individual driver ICs 1 to be latched by the latch circuits 44, and then the strobe signal STB causes those data signals to be fed to the drive circuits 47. This time, the control signal DIVSEL1 has previously turned to H level and the control signal DIVSEL2 to H level; thus only the division timing signal DIV4 turns to H level and the other division timing signals DIV1 to DIV3 remains at L level. Accordingly, the division timing signal DIV4 selects the corresponding group, and the driver ICs 1 drive the light-emitting devices 22. Meanwhile, 1,824 data signals (#1, #5, #9, . . . and #7293) are sequentially fed to the data input terminal SI of the nineteenth driver IC 1, and are taken in by the shift registers 43 of the individual driver ICs 1.

Thereafter, the driver ICs 1 repeat, for the second and the following lines, the same operations that it performed for the data of the first line. By performing selective light emission in this way for each line, and performing that repeatedly, it is possible to achieve exposure of one frame.

In this embodiment, four division timing signals DIV1 to DIV4 are generated on the basis of two control signals DIVSEL1 and DIVSEL2. This makes it possible to reduce the number of terminals of the ICs and the number of assembly steps thereof Moreover, the selection of the desired group by the use of the division timing signals DIV1 to DIV4 can be achieved by giving the two control signals DIVSEL1 and DIVSEL2 an appropriate combination of levels. This makes it possible to set the order of selection freely.

Sixth Embodiment

Figure 26:
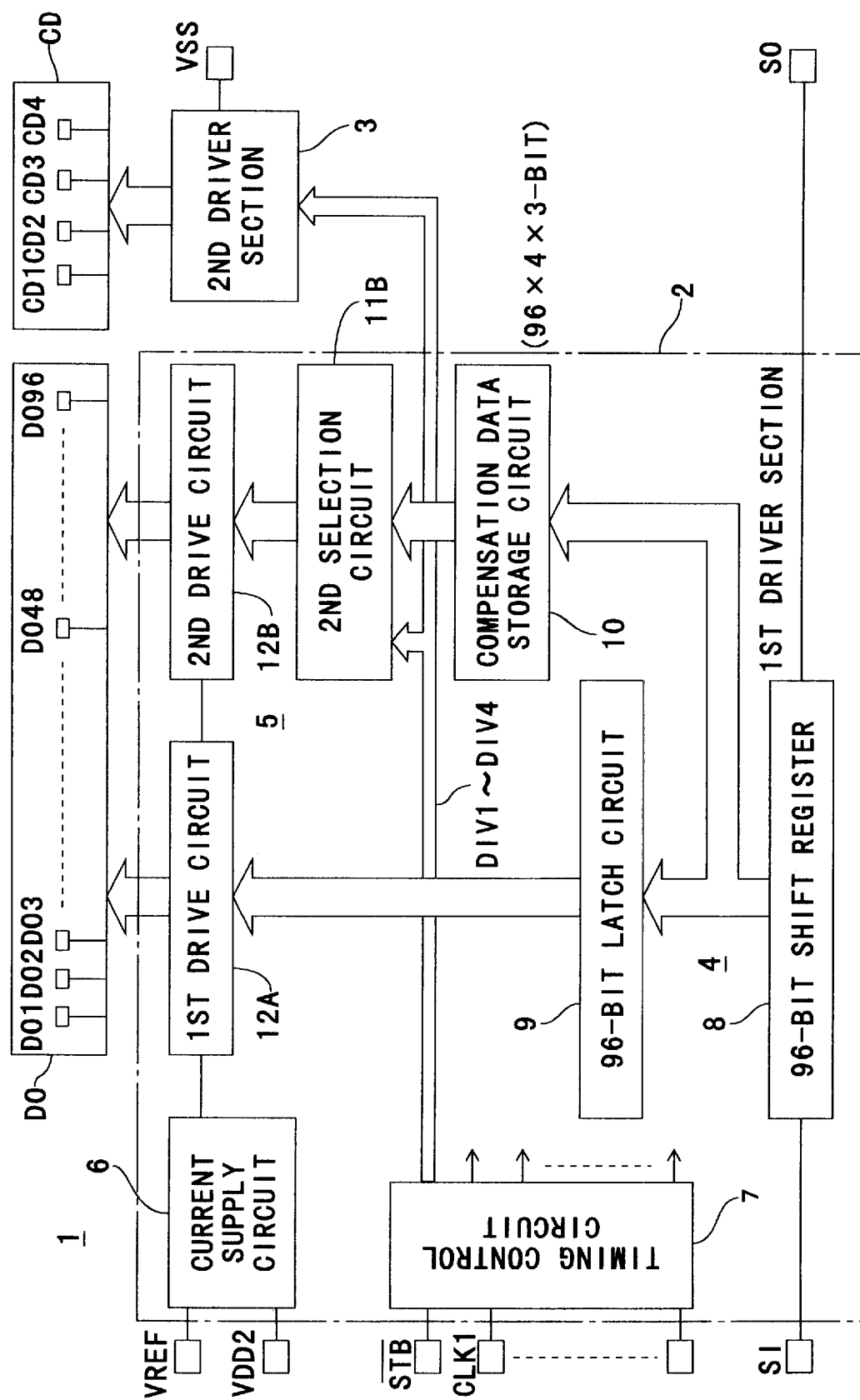
FIG. 26 is a circuit block diagram of a principal portion of the driver IC of a sixth embodiment of the present invention.

Next, a sixth embodiment of the invention will be described. FIG. 26 is a circuit block diagram showing the basic configuration of the driver IC of the sixth embodiment. The configuration shown in FIG. 26 differs from that shown in FIG. 10 in that the shift register 8 and the latch circuit 9 are of n (96) bit type and that data signals are fed from the latch circuit 9 directly to the first drive circuit 12A; therefore, in FIG. 26, such circuit blocks as are found also in FIG. 10, are identified with the same reference numerals, and their descriptions will not be repeated.

Figure 27:
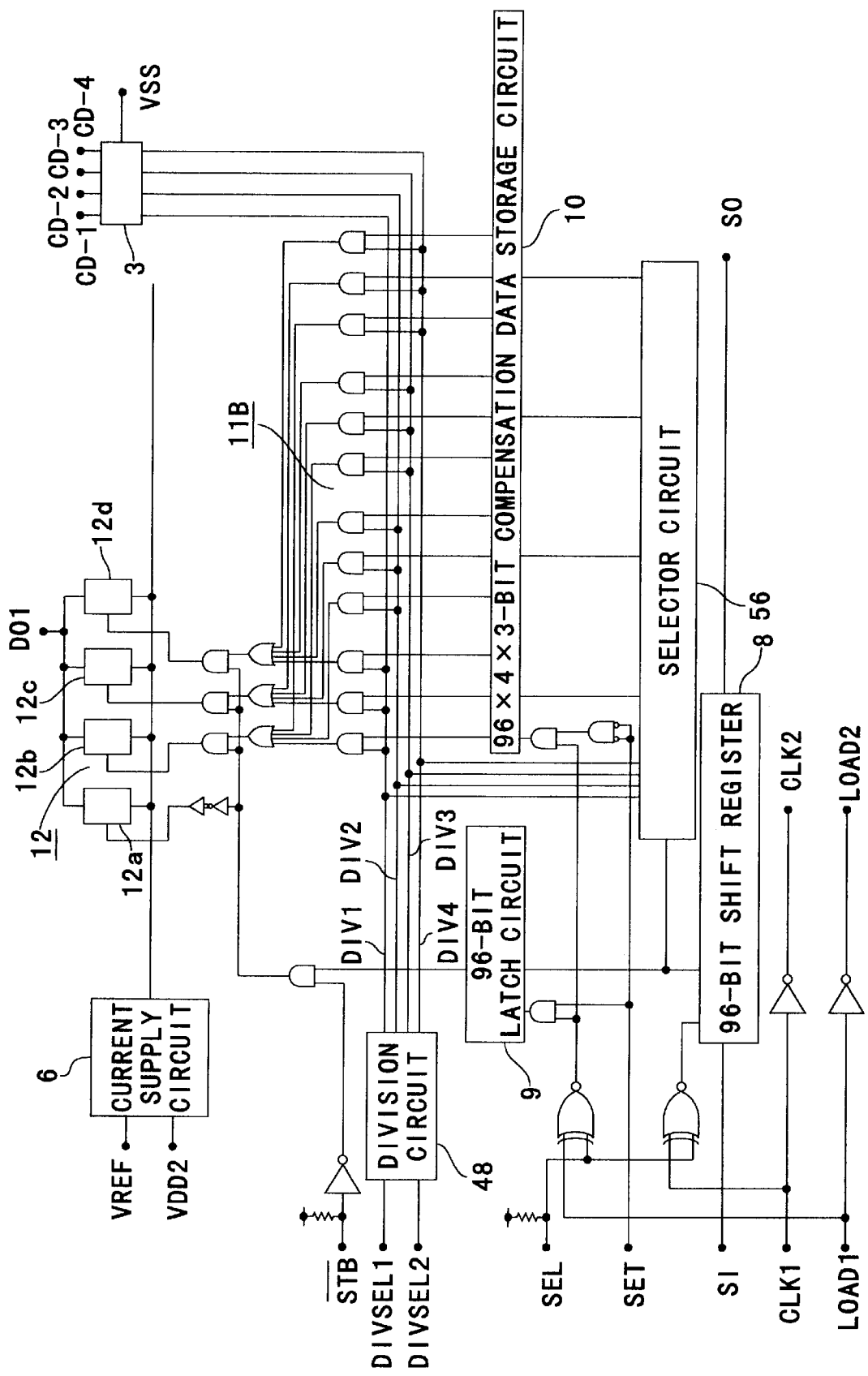
FIG. 27 is a circuit block diagram showing a principal portion of the sixth embodiment.

FIG. 27 is a circuit block diagram of a principal portion of the circuit block diagram shown in FIG. 26, specifically a portion related to one output terminal DO1 among a plurality of output terminals DO1 to DO96. Like the division circuit 48 in the fifth embodiment (FIG. 23), a division circuit 48 included in the timing control circuit 7 generates division timing signals DIV1 to DIV4 on the basis of two control signals DIVSEL1 and DIVSEL2. The data output from the latch circuit 9 is fed to the current amplifier 12a through an AND gate circuit of which the opening/closing is controlled by the strobe signal STB. Moreover, as in the first embodiment (FIG. 2), on the basis of a load signal LOAD1, the latch circuit 9 takes in, parallel, the data signals taken in by the shift register 8. In addition, between the shift register 8 and the compensation data storage circuit 10, a selector circuit 56 is provided. This selector circuit 56 is controlled by the division timing signals DIV1 to DIV4 so as to select one from among four signal lines connecting the selector circuit 56 to the compensation data storage circuit 10 as the signal line by way of which to feed the data output from the shift register 8 to the compensation data storage circuit 10. In other respects, the configuration shown in FIG. 27 is the same as that shown in FIG. 11; therefore, in FIG. 27, such circuit blocks as are found also in FIG. 11, are identified with the same reference numerals, and their descriptions will not be repeated. As in the second embodiment, the compensation data storage circuit 10 can store n×m (384) sets of s-bit (for example, 3-bit) data; that is, it is built as a storage circuit of s×n×m (1,152)-bit type.

As described above, the driver IC of this embodiment is a version of the driver IC of the fifth embodiment that further incorporates such a compensation data storage circuit 10 as is provided in the driver ICs of the first to third embodiment. As a result, as in the first to third embodiments, n×m (384) compensation data signals to be used for output compensation are stored in the compensation data storage circuit 10, and, as in the fifth embodiment, according to the n (96)-bit data that is fed from the shift register 8 one quarter of a line after another, one among the signal lines connecting the selector circuit 56 to the compensation data storage circuit 10 is selected. Then, according to the n (96)-bit data, the compensation data storage circuit 10 feeds 96 compensation data signals to the first drive circuit 12A.

In this embodiment, as in the fifth embodiment, the division circuit 48 generates the division timing signals DIV1 to DIV4 on the basis of the two control signals DIVSEL1 and DIVSEL2, and feeds them to the circuits in the succeeding stages. However, the division circuit 48 may be so configured, as in the fourth embodiment, as to generate the division timing signals DIV1 to DIV4 on the basis of the control signal DIVSEL1 alone. This helps reduce the number of terminals required to receive signals from outside.

The strobe control circuit 14 in the first embodiment, the selection control signal generating circuit 30 in the second and third embodiments, and the division circuit 48 in the fourth embodiment are each composed of flip-flops FF1 and FF2 and logic gate circuits G1 to G4. In these circuits, i.e. the strobe control circuit 14, the selection control signal generating circuit 30, and the division circuit 48, the flip-flops FF1 and FF2 constitute a 2-bit counter circuit, and the logic gate circuits G1 to G4 constitute a decoder that generates four signals on the basis of the output of the counter circuit.

In this way, in the first to fourth embodiments, the strobe control circuit 14, the selection control signal generating circuit 30, and the division circuit 48 are built as a circuit composed of a 2-bit counter circuit and a decoder that generates four signals by the use of the output of the counter circuit. However, the configuration of these circuits is not limited to this specific configuration. For example, the strobe control circuit, the selection control signal generating circuit, and the division circuit may each be built as a circuit composed of an x-bit counter circuit, consisting of x flip-flops, and a decoder, consisting of m logic gate circuits, that generates m signals on the basis of the output of the counter circuit. In that case, x and m fulfill the relationship $x < m \leq 2^x$.

On the other hand, in the fifth and sixth embodiments, the division circuit 48 is built as a 2-input, 4-output decoder consisting of logic gates G1 to G4. However, the configuration of this decoder is not limited to this specific configuration. For example, the division circuit 48 may be built as an x-input, m-output decoder. In that case, x and m fulfill the relationship $x < m \leq 2^x$.

Industrial Applicability

As described above, according to the present invention, the number of control signals that are fed from outside to driver ICs for group selection is smaller than the number of groups. This helps reduce the number of terminals of the driver ICs. This in turn helps reduce the number of wires required for wiring and reduce the number of assembly steps. Thus, it is possible to enhance the efficiency of assembly and lessen the occurrence of failure. Moreover, it is possible to make the driver ICs smaller.

Moreover, according to the present invention, compensation data signals are stored so that light-emitting devices are driven with data signals that have been corrected individually with the corresponding compensation data signals. This helps reduce variations in operation characteristics among the light-emitting devices.

Moreover, according to the present invention, each driver IC stores n×m data signals fed sequentially thereto in a data signal storage circuit, selects and takes out the data signals stored in the data signal storage circuit in batches of n data signals, and, by the use of the thus selected data signals, makes a drive circuit connected to n output terminals operate and makes a second driver section connected to n selection terminals synchronize. This eliminates the need to rearrange data signals even when light-emitting devices are driven in a plurality of groups, and thus makes signal processing easy.

As described above, the present invention is very useful for driver ICs and optical print heads.

What is claimed is:

1. A driver IC for supplying driving currents to m groups×n light-emitting diodes arranged in a row, the driver IC having n first output terminals each connected to first electrodes of m light-emitting diodes (where $m \geq 3$) and having m second output terminals each connected to second electrodes m light-emitting diodes, the driver IC comprising:
   a data signal storage circuit for storing temporarily and sequentially at least n×m data signals simultaneously, that are fed thereto;

a second driver section for keeping one of the second output terminals at a predetermined potential so as to activate the light-emitting diodes connected to said one of the second output terminals;

a control circuit for feeding the second driver section with designation signals for designating one of the second output terminals, and for selecting data signals corresponding to the light-emitting diodes connected to the one of the second output terminals kept at the predetermined potential from among the data signals stored in said data signal storage circuit;

a first driver section for outputting the driving currents via the first output terminals in accordance with the data signals selected by the designation signals, wherein the control circuit outputs the designation signals on a basis of control signals fed thereto from outside by way of a number of signal lines fewer than m, and a number of the data signals stored temporarily and simultaneously in said data signal storage circuit is at least three times a number of said first output terminals.

2. A driver IC as claimed in claim 1, wherein the control circuit controls the second driver section in such a way that the light-emitting diodes arranged in a row are activated sequentially as the designation signals are switched.

3. A driver IC as claimed in claim 2, wherein the control circuit has x input signal lines (where x<m) and m output lines by way of which the designation signals are fed to the second driver section, and the data signals belonging to one of the m groups are selected from said data signal storage circuit.

4. A driver IC as claimed in claim 1, wherein the control circuit is composed of a pulse counter circuit for counting pulses included in the control signals, which each consist of a train of pulses, and a logic circuit for combining signals output from the pulse counter circuit so as to output the designation signals to the m output lines.

5. A driver IC as claimed in claim 1, wherein the signal lines are dedicated to the control signals.

6. A driver IC as claimed in claim 1, wherein the signal lines are shared between the control signals and other signals.

7. A driver IC as claimed in claim 1, wherein the first driver section includes a compensation data storage circuit for storing simultaneously compensation data for the light-emitting diodes individually, and n compensation data corresponding to one of the m groups of the light-emitting diodes are selected by way of said designation signals.

8. A driver IC for supplying driving currents to m groups×n light-emitting diodes arranged in a row, the driver IC having n first output terminals each connected to first electrodes of m light-emitting diodes (where m≧2) and having m second output terminals each connected to second electrodes of n light-emitting diodes, the driver IC comprising:

a shift register for receiving m×n data signals corresponding to the m groups×n light-emitting diodes from outside;

a latch circuit for storing temporarily and simultaneously at least m×n data signals fed sequentially from the shift register;

a data selection circuit for selecting and extracting sequentially, in batches of n data signals, the data signals stored in the latch circuit;

a first driver section including a drive circuit for outputting the driving currents on a basis of the selected data signals via the first output terminals; and a second driver section for keeping one of the second output terminals at a predetermined potential so as to activate the light-emitting diodes connected to said one of the second output terminals, wherein a number of the data signals stored temporarily and simultaneously in said latch circuit is at least three times a number of said first output terminals.

9. A driver IC as claimed in claim 8, further comprising:

a control circuit for designating said one of the second output terminals that is kept at the predetermined potential by the second driver section and for feeding the data selection circuit with designation signals for designating the data signals in batches of n data signals.

10. A driver IC as claimed in claim 8, wherein the first driver section includes a compensation data storage circuit for storing simultaneously m×n compensation data corresponding to the light-emitting diodes individually, when said data selection circuit selects and extracts sequentially, in batches of n compensation data, the compensation data stored in the compensation data storage circuit, the drive circuit outputs the driving currents on a basis of the data signals and the compensation data, and a number of the compensation data stored simultaneously in said compensation data storage circuit is at least three times a number of said first output terminals.

11. An optical print head comprising a plurality of light-emitting devices, each having m groups×n light-emitting elements, and a plurality of driver ICs, each corresponding to each of the light-emitting devices, for supplying driving currents to the light-emitting elements, wherein the light-emitting device has n first electrodes each connected to first electrodes of m light-emitting elements (where m≧3) and m second electrodes each connected to second electrodes of m light-emitting elements, the driver IC comprises:

n first output terminals connected individually to the first electrodes of the light-emitting device;

m second output terminals connected individually to the second electrodes of the light-emitting device;

a data signal storage circuit for storing temporarily and sequentially at least n×m data signals simultaneously, that are fed thereto;

a second driver section for keeping one of the second output terminals at a predetermined potential so as to activate the light-emitting elements connected to said one of the second output terminals;

a control circuit for feeding the second driver section with designation signals for designating one of the second output terminals and for selecting data signals corresponding to the light-emitting elements connected to the one of the second output terminals kept at the predetermined potential from among the data signals stored in said data signal storage circuit; and a first driver section for outputting the driving currents via the first output terminals in accordance with the data signals selected by the designation signals, wherein the control circuit outputs the designation signals on a basis of control signals fed thereto by way of a number of signal lines fewer than m, and a number of the data signals stored temporarily and simultaneously in said data signal storage circuit is at least three times a number of said first output terminals.

12. An optical print head as claimed in claim 11,
wherein the light-emitting devices are laid over the driver ICs individually so that the light-emitting elements are arranged in a row.

13. An optical print head as claimed in claim 12,
wherein the light-emitting device is disposed on an upper surface of the driver IC with an electrically insulating layer sandwiched in between, and is located in a center of the driver IC having a light-emitting side thereof facing a side opposite to the electrically insulating layer, and
electrical connections between the light-emitting device and the driver IC are made at longer sides of the light-emitting device.

14. An optical print head comprising a light-emitting device, having m groups×n light-emitting elements, and a driver IC for supplying driving currents to the light-emitting elements of the light-emitting device,
wherein the light-emitting device has n first electrodes each connected to first electrodes of m light-emitting elements (where m≧2) and m second electrodes each connected to second electrodes of m light-emitting elements,
the driver IC comprises:
n first output terminals connected individually to the first electrodes of the light-emitting device;
m second output terminals connected individually to the second electrodes of the light-emitting device;
a shift register for receiving m×n data signals corresponding to the m groups×n light-emitting elements from outside;
a latch circuit for storing temporarily and simultaneously at least m×n data signals fed sequentially from the shift register;
a data selection circuit for selecting and extracting sequentially, in batches of n data signals, the data signals stored in the latch circuit;
a drive circuit for outputting the driving currents via the first output terminals on a basis of the extracted data signals; and
a second driver section for keeping one of the second output terminals at a predetermined potential so as to activate the light-emitting elements connected to said one of the second output terminals,
wherein a number of the data signals stored temporarily and simultaneously in said latch circuit is at least three times a number of said first output terminals.

15. A driver IC comprising n output terminals for driving a device, a first driver section connected to the individual output terminals, m group selection terminals, and a second driver section connected to the individual group selection terminals,
wherein the first driver section comprises:
a data signal storage circuit for storing simultaneously at least n×m data signals that are fed thereto sequentially;
a data selection circuit for selecting and extracting sequentially m times, in batches of n data signals, the data signals stored in the data signal storage circuit on a basis of control signals fed thereto from outside by way of signal lines; and
a drive circuit for outputting driving currents to the output terminals on a basis of the selected data signals, and
wherein the second driver section is configured to switch the m group selection terminals sequentially in synchronism with timing with which the data selection circuit selects the data signals in batches of n data signals, and
a number of the data signals stored simultaneously in said data signal storage circuit is at least three times a number of said output terminals.

16. A driver IC as claimed in claim 15, further comprising:
a compensation data storage circuit for storing simultaneously m×n compensation data corresponding to the n×m data signals individually,
wherein, when said data selection circuit selects and extracts, in batches of n compensation data, the compensation data stored in the compensation data storage circuit, the drive circuit outputs the driving currents on a basis of the data signals and the compensation data, and
a number of the compensation data stored simultaneously in said compensation data storage circuit is at least three times a number of said output terminals.

17. A driver IC as claimed in claim 16,
wherein the driver IC is a driver IC for driving a light-emitting device having m groups of n light-emitting elements group by group on a time-division basis.

18. A driver IC comprising n output terminals for driving a light-emitting device having light-emitting elements, a first driver section connected to the individual output terminals, m group selection terminals, and a second driver section connected to the individual group selection terminals, further comprising:
a timing control circuit for generating m division timing signals on a basis of a number of control signals fewer than m fed thereto from outside,
wherein the first driver section comprises:
a data signal storage circuit for storing at least n×m data signals in order in which the data signals are fed thereto in order in which the light-emitting elements are arranged;
a data selection circuit for selecting and extracting sequentially, in batches of n data signals, the data signals stored in the data signal storage circuit on a basis of the m division timing signals; and
a drive circuit for outputting driving currents on a basis of the selected data signals, and
wherein the second driver section is configured to switch the m group selection terminals sequentially in synchronism with timing with which the data selection circuit selects the data signals in batches of n data signals.

19. A driver IC as claimed in claim 18,
wherein the control signals fed to the timing control circuit are fed thereto by way of signal lines for feeding signals for controlling timing with which the data signals are stored in the data signal storage circuit.

20. A driver IC as claimed in claim 18,
wherein the control signals fed to the timing control circuit are fed thereto by way of signal lines dedicated to the control signals.

21. A driver IC as claimed in claim 18, further comprising:
a compensation data storage circuit for storing compensation data in order in which the light-emitting elements are arranged, for the n×m data signals individually.

22. A driver IC as claimed in claim 21,
wherein the driver IC is a driver IC for driving a light-emitting device having m groups of n light-emitting elements group by group on a time-division basis.

* * * * *